US012798784B2

(12) United States Patent
Tsuru et al.

(10) Patent No.: US 12,798,784 B2
(45) Date of Patent: Nov. 17, 2026

(54) AIRCRAFT AND FUEL SUPPLY METHOD

(71) Applicant: KAWASAKI JUKOGYO KABUSHIKI KAISHA, Kobe (JP)

(72) Inventors: Kazunari Tsuru, Kobe (JP); Hidekazu Iwasaki, Kobe (JP); Koichi Sasaki, Kobe (JP); Ayako Yajima, Kobe (JP); Kazuko Shimizu, Kobe (JP); Shingo Ichikawa, Kobe (JP); Ryo Nodo, Kobe (JP); Hiroki Kuyama, Kobe (JP); Shota Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 19/348,817

(22) Filed: Oct. 3, 2025

(65) Prior Publication Data

US 2026/0028131 A1 Jan. 29, 2026

Related U.S. Application Data

(63) Continuation of application No. PCT/JP2024/014025, filed on Apr. 5, 2024.

(60) Provisional application No. 63/457,439, filed on Apr. 6, 2023.

(51) Int. Cl.

| | |
|---|---|
| ***B64D 37/34*** | (2006.01) |
| ***B64D 37/00*** | (2006.01) |
| ***B64D 37/02*** | (2006.01) |
| ***B64D 37/30*** | (2006.01) |

(52) U.S. Cl.

CPC ........... *B64D 37/34* (2013.01); *B64D 37/005* (2013.01); *B64D 37/02* (2013.01); *B64D 37/30* (2013.01)

(58) Field of Classification Search

CPC ...... B64D 37/02; B64D 37/005; B64D 37/30; B64D 37/34

See application file for complete search history.

(56) References Cited

U.S. PATENT DOCUMENTS

2008/0006743 A1* 1/2008 Miller .................... B64U 10/25 244/53 R
2011/0070103 A1* 3/2011 Allidieres .............. F04B 15/08 417/307
2012/0156059 A1 6/2012 Watts (Continued)

FOREIGN PATENT DOCUMENTS

JP 2008-045463 A 2/2008
JP 2011-521180 A 7/2011

(Continued)

*Primary Examiner* — Tye William Abell
(74) *Attorney, Agent, or Firm* — XSENSUS LLP

(57) ABSTRACT

An aircraft includes a first tank and a second tank each storing low-temperature liquid fuel; a pump that receives supply of the low-temperature liquid fuel from the first tank and the second tank; and a controller. Each of the first tank and the second tank is switched between a fuel supply phase of supplying the low-temperature liquid fuel to the pump and a temperature restoring phase of cooling the low-temperature liquid fuel in each of the first tank and the second tank. The controller switches between a first mode where the first tank is in the fuel supply phase and the second tank is in the temperature restoring phase, and a second mode where the first tank is in the temperature restoring phase and the second tank is in the fuel supply phase.

17 Claims, 10 Drawing Sheets

(56) References Cited

U.S. PATENT DOCUMENTS

| | | | | |
|---|---|---|---|---|
| 2015/0121905 | A1 | 5/2015 | Watts | |
| 2015/0344144 | A1* | 12/2015 | Kamath | F02C 7/236 |
| | | | | 244/135 C |

FOREIGN PATENT DOCUMENTS

| | | | |
|---|---|---|---|
| JP | 2014-040240 | A | 3/2014 |
| JP | 2016-510376 | A | 4/2016 |

* cited by examiner

AIRCRAFT AND FUEL SUPPLY METHOD

CROSS REFERENCE TO RELATED APPLICATIONS

The present application claims priority to PCT/JP2024/014025 filed Apr. 5, 2024, and U.S. 63/457,439 filed Apr. 6, 2023, both of which are incorporated herein by reference.

FIELD OF INVENTION

The present disclosure relates to an aircraft that adopts low-temperature liquid fuel as an energy source and relates to a fuel supply method of supplying low-temperature liquid fuel.

BACKGROUND ART

An aircraft that adopts low-temperature liquid fuel as an energy source has been known. The aircraft includes a tank storing the low-temperature liquid fuel. The low-temperature liquid fuel stored in the tank is sucked out by a pump via a pipe and thereafter sent to an engine. For instance, Japanese Unexamined Patent Publication No. 2011-521180 discloses a structure including: a tank storing low-temperature liquid fuel; a pump; and a pipe that connects the tank and the pump to each other.

SUMMARY OF THE INVENTION

An aircraft according to an aspect of the present disclosure includes: a first tank and a second tank each of which stores low-temperature liquid fuel; a pump that receives supply of the low-temperature liquid fuel from the first tank and the second tank; and a controller. Each of the first tank and the second tank is switched between a fuel supply phase of supplying the low-temperature liquid fuel to the pump and a temperature restoring phase of cooling the low-temperature liquid fuel in each of the first tank and the second tank. The controller switches between a first mode where the first tank is in the fuel supply phase and the second tank is in the temperature restoring phase, and a second mode where the first tank is in the temperature restoring phase and the second tank is in the fuel supply phase.

A fuel supply method according to another aspect of the present disclosure is a fuel supply method of supplying low-temperature liquid fuel stored in a first tank and a second tank to a pump connected to the first tank and the second tank. The fuel supply method includes: allowing each of the first tank and the second tank to be switched between a fuel supply phase of supplying the low-temperature liquid fuel to the pump, and a temperature restoring phase of cooling the low-temperature liquid fuel in each of the first tank and the second tank; and alternately switching between a first mode where the first tank is in the fuel supply phase and the second tank is in the temperature restoring phase, and a second mode where the first tank is in the temperature restoring phase and the second tank is in the fuel supply phase.

DETAILED DESCRIPTION

Hereinafter, embodiments concerning an aircraft according to the present disclosure will be described with reference to the accompanying drawings. The aircraft according to the present disclosure adopts hydrogen to be low-temperature liquid fuel as an energy source to fly. The aircraft may be a passenger aircraft or a cargo aircraft. A propulsion system for the aircraft may be, for example, in the form of: a hydrogen combustion gas turbine engine; an electric propulsion device including a fuel cell and an electric motor in combination; or a hybrid propulsion device including the gas turbine engine and the electric propulsion device.

Overview of an Aircraft

Figure 1:
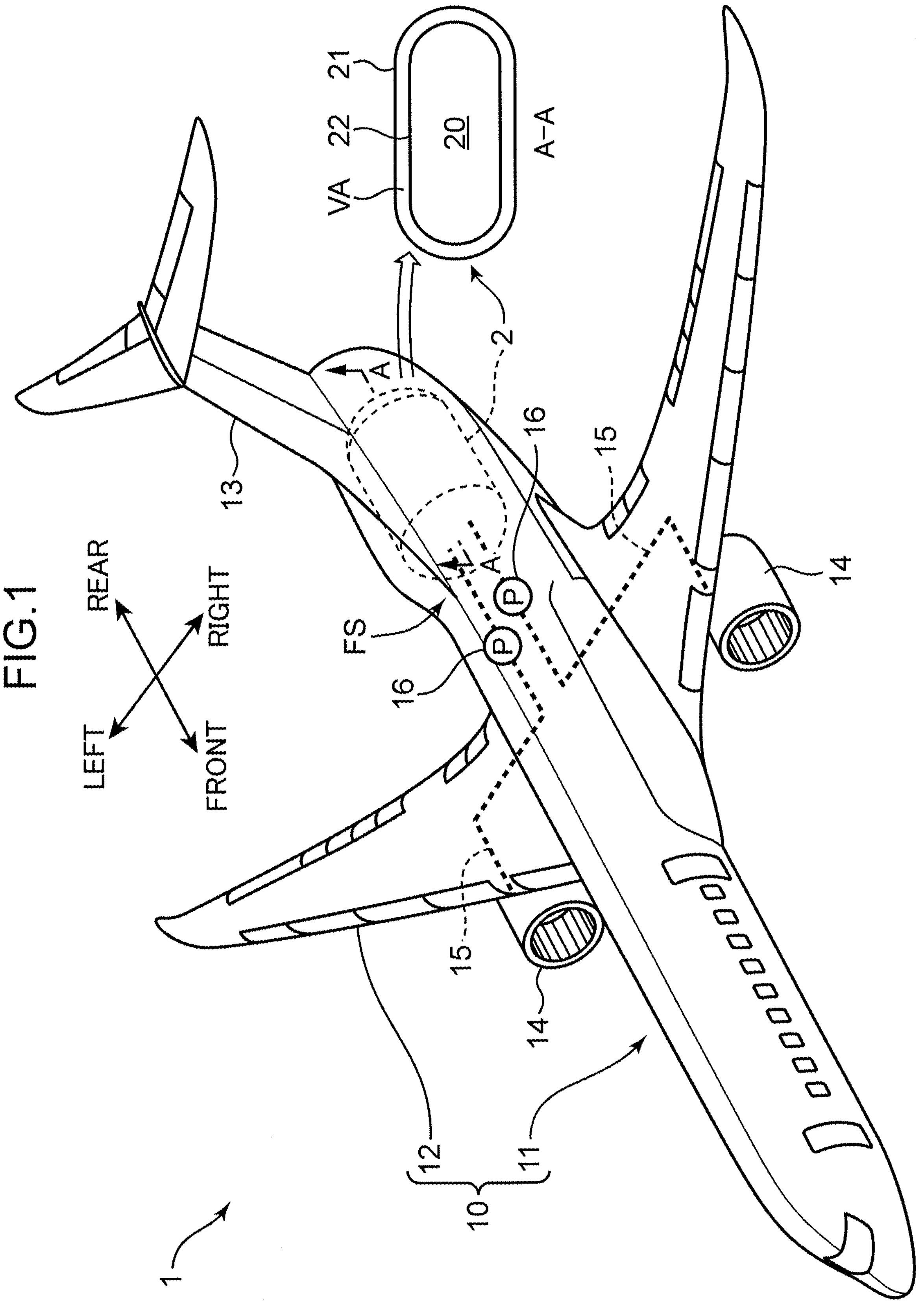
FIG. 1 is a perspective view of an aircraft according to the present disclosure in which a fuel supply system is mounted.

FIG. 1 is a perspective view of an aircraft 1 according to the present disclosure. The aircraft 1 includes a machine body 10, an engine combustor 14, and a hydrogen fuel tank 2 located in a rear portion of the machine body 10. The hydrogen fuel tank 2 may be mounted at any appropriate position of the machine body 10 without limitation to the rear portion of the machine body 10.

The machine body 10 includes a fuselage 11, a pair of left and right wings 12, and a tail 13. The fuselage 11 includes structural components, such as a circular frame and a stringer, and a fuselage panel assembled in a cylindrical shape. The pair of wings 12 include spars and flaps, and respectively extend leftward and rightward from the fuselage 11. The tail 13 is located at an end of the fuselage 11, and includes a vertical stabilizer and a horizontal stabilizer. The engine combustor 14 includes, for example, a hydrogen combustion gas turbine engine that adopts liquefied hydrogen LH as fuel. Such an engine combustor 14 is fixedly attached to each of the pair of wings 12.

The hydrogen fuel tank 2 stores the liquefied hydrogen LH to be fuel of each engine combustor 14. The hydrogen fuel tank 2 is located in an accommodation section at a rear end of the fuselage 11. Although the hydrogen fuel tank 2 is illustrated as a single tank in FIG. 1 for convenience, the hydrogen fuel tank 2 may include tanks as described later in some embodiments. The hydrogen fuel tank 2 and the engine combustor 14 are connected to each other by a supply line 15. The supply line 15 indicates a fuel supply pipe. The supply line 15 is provided with a booster pump 16 to send out the liquefied hydrogen LH from the hydrogen fuel tank 2 to a predetermined supply destination. In the embodiment, the supply destination indicates each of the left and right engine combustors 14. The liquefied hydrogen LH stored in the hydrogen fuel tank 2 is supplied to the engine combustor 14 via the supply line 15. The hydrogen fuel tank 2, the supply line 15, and the booster pump 16 constitute a part of a fuel supply system FS.

Such a tank to store the liquefied hydrogen LH typically needs high heat insulation performance to maintain a cryogenic state. One way to ensure the high heat insulation performance is to make the tank have a vacuum double shell structure. The hydrogen fuel tank 2 in the embodiment also has a vacuum double shell tank structure. As illustrated in an additional cross-sectional view taken along the line A-A in FIG. 1, the hydrogen fuel tank 2 includes an outer tank 21, and an inner tank 22 located in the outer tank 21 with a gap from the outer tank. The inner tank 22 has an inner space serving as a storage space 20 to accommodate the liquefied hydrogen LH. The outer tank 21 exerts a heat insulation effect. The gap defined between an inner surface of the outer tank 21 and an outer surface of the inner tank 22 forms a vacuum layer VA. The vacuum layer VA is evacuated to create a vacuum at operation of the hydrogen fuel tank 2. Here, the "vacuum" means a space filled with gas having a pressure lower than a normal atmospheric pressure.

Disadvantage to Fuel Supply in the Aircraft

One disadvantage concerning the aircraft 1 that adopts low-temperature liquid fuel, e.g., the liquefied hydrogen LH, as an energy source is high likelihood of occurrence of cavitation in the booster pump 16. Such occurrence of cavitation in the booster pump 16 may lead to an increase in a load applied to the pump impeller that rotates in the booster pump 16, resulting in affecting the booster pump 16.

The net positive suction head has been known as giving an index to determine whether cavitation occurs. The net positive suction head is also referred to as "NPSH". The NPSH includes two kinds of the "net positive suction head required" that is unique to a pump and the "net positive suction head available" that is demanded in terms of an operating condition. The net positive suction head required that is unique to a pump is also referred to as "NPSHr". The net positive suction head available that is demanded in terms of the operating condition is also referred to as "NPSHa". When the NPSHa is higher than the NPSHr, i.e., "NPSHa>NPSHr", the booster pump 16 can suck the liquefied hydrogen LH. When the NPSHa is lower than NPSHr, i.e., "NPSHa<NPSHr", the booster pump 16 faces difficulty in sucking the liquefied hydrogen LH, and thus, cavitation may occur in the booster pump 16.

From these perspectives, it is preferable for the NPSHa to be higher or the NPSHr to be lower to reduce the occurrence of cavitation. In this regard, although a way of improving the performance of the booster pump 16 to reduce the occurrence of cavitation has been known, the way may result in a size increase and a cost increase in the booster pump 16. The aircraft 1 according to the present disclosure solves the disadvantage. Hereinafter, structures to solve the disadvantage will be described in detail.

First Embodiment

Figure 2:
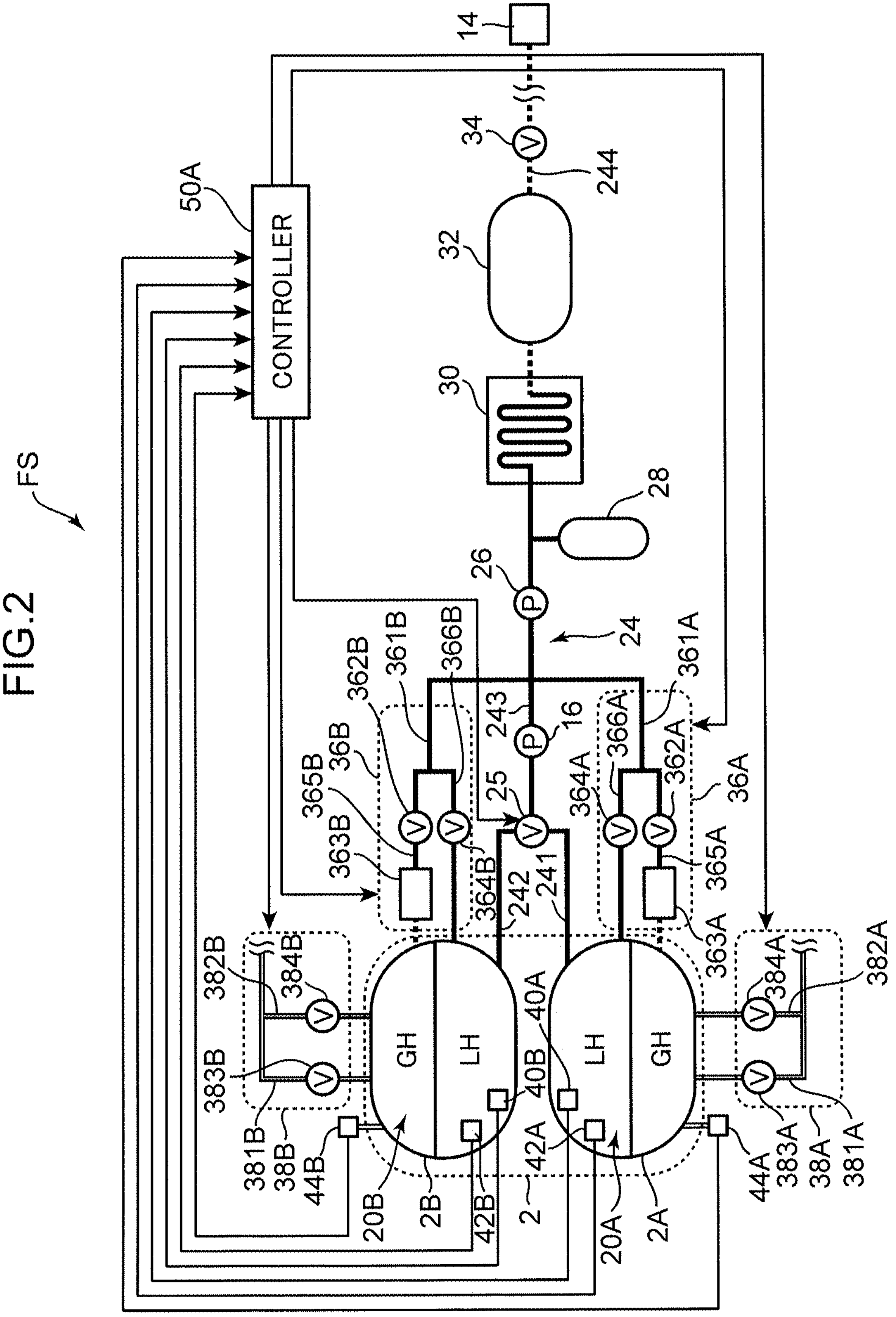
FIG. 2 is a system diagram illustrating a configuration of the fuel supply system mounted in the aircraft in FIG. 1.

FIG. 2 is a system diagram illustrating a configuration of the fuel supply system FS mounted in the aircraft 1. The fuel supply system FS supplies the liquefied hydrogen LH as fuel to each engine combustor 14. The fuel supply system FS includes a first hydrogen fuel tank 2A and a second hydrogen fuel tank 2B, a main pipe 24, a switch valve 25, the booster pump 16, an engine pump 26, an accumulator 28, a vaporizer 30, a buffer tank 32, a flow rate control valve 34, and a controller 50A. In the embodiment, the hydrogen fuel tank 2 includes two tanks of the first hydrogen fuel tank 2A and the second hydrogen fuel tank 2B. The first hydrogen fuel tank 2A is an example of the "first tank" in the disclosure, the second hydrogen fuel tank 2B is an example of the "second tank" in the disclosure, and the booster pump 16 is an example of the "pump" in the disclosure.

The fuel supply system FS further includes a first tank pressure-increase mechanism 36A that increases a pressure in the first hydrogen fuel tank 2A, a first tank pressure-reduction mechanism 38A that reduces the pressure in the first hydrogen fuel tank 2A, a second tank pressure-increase mechanism 36B that increases a pressure in the second hydrogen fuel tank 2B, and a second tank pressure-reduction mechanism 38B that reduces the pressure in the second hydrogen fuel tank 2B. In the following description of the fuel supply system FS, a direction in which the liquefied hydrogen LH or vaporized gas of the liquefied hydrogen LH flows is defined as a reference, and a location based on the reference is expressed with "upstream" or "downstream".

The first hydrogen fuel tank 2A has a storage space 20A to store the liquefied hydrogen LH, and has a vacuum double-shell structure. Similarly, the second hydrogen fuel tank 2B has a storage space 20B to store the liquefied hydrogen LH, and has a vacuum double-shell structure. However, FIG. 2 illustrates each of the first hydrogen fuel tank 2A and the second hydrogen fuel tank 2B with a single-shell structure for simplification. Each of the first hydrogen fuel tank 2A and the second hydrogen fuel tank 2B is made of metal, e.g., aluminum, or formed of a composite member including carbon fiber reinforced plastics (CFRP), glass fiber reinforced plastics (GFRP), or other member. Each of the first hydrogen fuel tank 2A and the second hydrogen fuel tank 2B may have any shape suitable for maintaining a high pressure without limitation. The storage space 20A has a storage area for the liquefied hydrogen LH, and a gaseous state area GH located above the storage area. Similarly, the storage space 20B has a storage area for the liquefied hydrogen LH and a gaseous state area GH located above the storage area. Each gaseous state area GH is occupied with boil-off gas of the liquefied hydrogen LH generated due to heat entering each of the first hydrogen fuel tank 2A and the second hydrogen fuel tank 2B, or occupied with vaporized gas containing hydrogen gas supplied from each of the first tank pressure-increase mechanism 36A and the second tank pressure-increase mechanism 36B. Here, a lower area in the first hydrogen fuel tank 2A on the sheet of FIG. 2 corresponds to the area located above.

The first hydrogen fuel tank 2A includes various attachments. Specifically, the first hydrogen fuel tank 2A includes, as the attachments, a first fuel remaining amount sensor 40A, a first temperature sensor 42A, and a first pressure sensor 44A. The first fuel remaining amount sensor 40A measures a remaining amount L1 of the liquefied hydrogen LH stored in the first hydrogen fuel tank 2A. The first temperature sensor 42A measures a temperature T1 of the liquefied hydrogen LH stored in the first hydrogen fuel tank 2A. The first pressure sensor 44A measures an internal pressure PI1 being a pressure of the hydrogen gas in the storage space 20A.

The second hydrogen fuel tank 2B includes various attachments. Specifically, the second hydrogen fuel tank 2B includes, as the attachments, a second fuel remaining amount sensor 40B, a second temperature sensor 42B, and a second pressure sensor 44B. The second fuel remaining amount sensor 40B measures a remaining amount L2 of the liquefied hydrogen LH stored in the second hydrogen fuel tank 2B. The second temperature sensor 42B measures a temperature T2 of the liquefied hydrogen LH stored in the second hydrogen fuel tank 2B. The second pressure sensor 44B measures an internal pressure PI2 being a pressure of the hydrogen gas in the storage space 20B.

The main pipe 24 includes a first supply pipe 241, a second supply pipe 242, a third supply pipe 243, and a fourth supply pipe 244. The first supply pipe 241 and the second supply pipe 242 are arranged in parallel.

The first supply pipe 241 has an upstream end connected to the first hydrogen fuel tank 2A. The first supply pipe 241 has a downstream end connected to the switch valve 25. The second supply pipe 242 has an upstream end connected to the second hydrogen fuel tank 2B. The second supply pipe 242 has a downstream end connected to the switch valve 25. The third supply pipe 243 connects the switch valve 25 and the vaporizer 30 to each other. The fourth supply pipe 244 connects the vaporizer 30 and the engine combustor 14 to each other.

The switch valve 25 switches a connection destination of the third supply pipe 243 to one of the first supply pipe 241 and the second supply pipe 242. The switch valve 25 switches the connection destination of the third supply pipe 243 in accordance with a switch signal output from the controller 50A.

The booster pump 16 is located on the third supply pipe 243, and sucks the liquefied hydrogen LH supplied from one of the first supply pipe 241 and the second supply pipe 242 and sends out the liquefied hydrogen LH downstream. The booster pump 16 may be formed of, for example, an electric pump including a motor. The booster pump 16 includes, in addition to the motor, a fluid component, such as a pump impeller, which rotates with motive power of the motor.

The engine pump 26 is located downstream of the booster pump 16, and sucks the liquefied hydrogen LH sent out of the booster pump 16, and sends out the liquefied hydrogen LH downstream. The engine pump 26 may be formed of a mechanical pump that utilizes an axial force of the engine combustor 14. The engine pump 26 includes a fluid component, such as a pump impeller, which rotates with motive power of the engine combustor 14.

The accumulator 28 is connected to the third supply pipe 243 that connects the booster pump 16 and the vaporizer 30 to each other. The accumulator 28 accumulates a part of the liquefied hydrogen LH flowing in the third supply pipe 243. The accumulator 28 is provided to reduce a pressure fluctuation and a flow rate fluctuation in the liquefied hydrogen LH flowing in the third supply pipe 243.

The vaporizer 30 heats and vaporizes the liquefied hydrogen LH flowing in the third supply pipe 243. For instance, a heat exchanger that utilizes exhausted heat of the engine is adopted for the vaporizer 30. Vaporized gas resulting from the vaporization by the vaporizer 30 flows into the fourth supply pipe 244. The vaporizer 30 adjusts a heat amount in accordance with a signal output from the controller 50A.

The buffer tank 32 is located on the fourth supply pipe 244 that connects the vaporizer 30 and the engine combustor 14 to each other. The buffer tank 32 temporally stores the vaporized gas flowing in the fourth supply pipe 244 to reduce a flow rate fluctuation and a pressure fluctuation in the vaporized gas in the fourth supply pipe 244.

The flow rate control valve 34 controls the flow rate of the vaporized gas flowing in the fourth supply pipe 244. The flow rate control valve 34 may be an electric valve having an opening degree which is adjustable. The opening degree of the flow rate control valve 34 is adjusted in accordance with a flow rate signal output from the controller 50A.

The first tank pressure-increase mechanism 36A increases the pressure in the first hydrogen fuel tank 2A. Specifically, the first tank pressure-increase mechanism 36A increases the internal pressure PI1 in the first hydrogen fuel tank 2A. The first tank pressure-increase mechanism 36A includes a first return pipe 361A, a first pressure-increase regulating valve 362A, a first pressure-increase vaporizer 363A, and a first reflux regulating valve 364A. The first return pipe 361A is an example of the "return line" in the disclosure, and the first pressure-increase vaporizer 363A is an example of the "pressure-increase vaporizer" in the disclosure.

The first return pipe 361A is a pipe to return, to the first hydrogen fuel tank 2A, the liquefied hydrogen LH sent out of the booster pump 16. The first return pipe 361A branches from the third supply pipe 243 that connects the booster pump 16 and the engine pump 26 to each other, and defines a passage to return to the first hydrogen fuel tank 2A. The first return pipe 361A branches into a first vaporization pipe 365A and a first reflux pipe 366A at a downstream position in a direction in which the liquefied hydrogen LH returns toward the first hydrogen fuel tank 2A. Each of the first vaporization pipe 365A and the first reflux pipe 366A has a downstream end communicating with the storage space 20A in the first hydrogen fuel tank 2A. The first vaporization pipe 365A is a pipe branching from the main pipe 24 to vaporize the liquefied hydrogen LH taken out of the main pipe and return resultant vaporized gas to the first hydrogen fuel tank 2A. The first reflux pipe 366A is a pipe branching from the main pipe 24 to return the liquefied hydrogen LH taken out of the main pipe to the first hydrogen fuel tank 2A while being kept in the liquid state.

The first vaporization pipe 365A returns, to the first hydrogen fuel tank 2A, a part of or a whole of the liquefied hydrogen LH having been taken out in an amount larger than the amount required by the engine combustor 14. The first pressure-increase regulating valve 362A and the first pressure-increase vaporizer 363A are located on the first vaporization pipe 365A.

The first pressure-increase regulating valve 362A regulates a flow rate of the liquefied hydrogen LH flowing in the first vaporization pipe 365A. In other words, the first pressure-increase regulating valve 362A adjusts an amount of the liquefied hydrogen LH to be returned to the first hydrogen fuel tank 2A in a vaporized state. The first pressure-increase regulating valve 362A may be an electric valve having an opening degree which is adjustable. The opening degree of the first pressure-increase regulating valve 362A is adjusted in accordance with an adjustment signal output from the controller 50A. The first pressure-increase regulating valve 362A may be a mechanical flow rate regulating valve.

The first pressure-increase vaporizer 363A heats and vaporizes the liquefied hydrogen LH flowing in the first vaporization pipe 365A. The first pressure-increase vaporizer 363A adjusts a heat amount in accordance with an instruction signal output from the controller 50A. The liquefied hydrogen LH having the flow rate regulated by the first pressure-increase regulating valve 362A is heated and vaporized by the first pressure-increase vaporizer 363A when returning to the first hydrogen fuel tank 2A via the first vaporization pipe 365A. Resultant hydrogen gas to be vaporized fuel is returned to the gaseous state area GH in the first hydrogen fuel tank 2A. Consequently, a gas amount in the gaseous state area GH increases, and accordingly, the pressure in the first hydrogen fuel tank 2A increases, that is, the internal pressure PI1 in the first hydrogen fuel tank 2A increases.

The first reflux pipe 366A is a pipe to return, to the first hydrogen fuel tank 2A, a part of or a whole of the liquefied hydrogen LH taken out in surplus, in the same manner as the first vaporization pipe 365A. The liquefied hydrogen LH flowing in the first reflux pipe 366A is returned to the first hydrogen fuel tank 2A while being kept in the liquid state. In a case of no reduction in the internal pressure PI1 in the first hydrogen fuel tank 2A, vaporization of the liquefied hydrogen LH in surplus is unnecessary. In this case, the liquefied hydrogen LH in surplus is returned to the first hydrogen fuel tank 2A via the first reflux pipe 366A while being kept in the liquid state so that the liquefied hydrogen LH in surplus can be reused as fuel. In a case where the internal pressure PI1 in the first hydrogen fuel tank 2A reaches a target pressure by vaporizing a part of the liquefied hydrogen LH in surplus and returning resultant vaporized gas to the first hydrogen fuel tank 2A, a remaining part of the liquefied hydrogen LH in surplus is returned to the first hydrogen fuel tank 2A via the first reflux pipe 366A while being kept in the liquid state.

The first reflux regulating valve 364A is located on the first reflux regulating valve 366A. The first reflux regulating valve 364A regulates a flow rate of the liquefied hydrogen LH flowing in the first reflux regulating valve 366A. The first reflux regulating valve 364A may be a mechanical pressure regulating valve, and opens or closes depending on, for example, a line pressure at a downstream position of the booster pump 16. Specifically, the first reflux regulating valve 364A opens when the line pressure is a predetermined pressure or higher and closes when the line pressure is lower than the predetermined pressure. The first reflux regulating valve 364A may be an electric flow rate regulating valve having an opening degree to be controlled by the controller 50A.

As described above, in the embodiment, the first return pipe 361A to return the liquefied hydrogen LH in surplus to the first hydrogen fuel tank 2A branches into dual routes of: the first vaporization pipe 365A to vaporize the liquefied hydrogen LH and return resultant vaporized gas; and the first reflux pipe 366A to return the liquefied hydrogen LH kept in the liquid state. When the internal pressure PI1 in the first hydrogen fuel tank 2A is reduced, the dual routes independently allow the reduced internal pressure PI1 to be restored to a desired pressure.

The first tank pressure-reduction mechanism 38A reduces the pressure in the first hydrogen fuel tank 2A. The liquefied hydrogen LH in the first hydrogen fuel tank 2A is cooled when the first tank pressure-reduction mechanism 38A reduces the pressure in the first hydrogen fuel tank 2A. In other words, the first tank pressure-reduction mechanism 38A serves as a cooler that cools the liquefied hydrogen LH in the first hydrogen fuel tank 2A. The first tank pressure-reduction mechanism 38A includes a first pressure regulating pipe 381A, a first relief pipe 382A, a first pressure regulating valve 383A, and a first relief valve 384A. The first pressure regulating pipe 381A and the first relief pipe 382A are arranged in parallel. The first pressure regulating pipe 381A is an example of the “vent line” in the disclosure, and the first pressure regulating valve 383A is an example of the “pressure regulating valve” in the disclosure.

Each of the first pressure regulating pipe 381A and the first relief pipe 382A is connected to the first hydrogen fuel tank 2A. Each of the first pressure regulating pipe 381A and the first relief pipe 382A extends outside from a top of the first hydrogen fuel tank 2A to allow the gaseous state area GH in the storage space 20 to communicate with outside air. Each of the first pressure regulating pipe 381A and the first relief pipe 382A has an upstream end opening to the storage space 20A. The first pressure regulating pipe 381A and the first relief pipe 382A may merge downstream to communicate with the outside air.

The first pressure regulating valve 383A is located on the first pressure regulating pipe 381A. The first relief valve 384A is located on the first relief pipe 385A.

The first pressure regulating valve 383A opens when the internal pressure PI1 in the first hydrogen fuel tank 2A is higher than a set value. The first pressure regulating valve 383A may be of a mechanical type to mechanically open when the internal pressure PI1 reaches the set value or higher, or may be of an electric type to open or close in accordance with an instruction signal from the controller 50A. When the first pressure regulating valve 383A is opened, the hydrogen gas in the gaseous state area GH is emitted to the atmosphere via the first pressure regulating pipe 381A. This consequently maintains the internal pressure PI1 in the first hydrogen fuel tank 2A at the set value or lower.

The first relief valve 384A is opened when the internal pressure PI1 in the first hydrogen fuel tank 2A is higher than a set value in the same manner as the first pressure regulating valve 383A. The first relief valve 384A may be any of a mechanical type and an electric type. For instance, in a case where the internal pressure PI1 in the first hydrogen fuel tank 2A rapidly increases due to, for example, damage to the first pressure regulating valve 383A, the first relief valve 384A is opened. When the first relief valve 384A is opened, the hydrogen gas in the gaseous state area GH is emitted to the atmosphere via the first relief pipe 382A, and the internal pressure PI1 in the first hydrogen fuel tank 2A reduces.

The second tank pressure-increase mechanism 36B increases the pressure in the second hydrogen fuel tank 2B. Specifically, the second tank pressure-increase mechanism 36B increases the internal pressure PI2 in the second hydrogen fuel tank 2B. The second tank pressure-increase mechanism 36B includes a second return pipe 361B, a second pressure-increase regulating valve 362B, a second pressure-increase vaporizer 363B, and a second reflux regulating valve 364B. The second return pipe 361B includes a second vaporization pipe 365B and a second reflux pipe 366B each resulting from branching at a downstream position in a direction in which the liquefied hydrogen LH returns toward the second hydrogen fuel tank 2B. The second tank pressure-increase mechanism 36B has the same structure and the same functionality as the first tank pressure-increase mechanism 36A described above, and thus, detailed description therefor will be omitted. The second return pipe 361B is an example of the “return line” in the disclosure, and the second pressure-increase vaporizer 363B is an example of the “pressure-increase vaporizer” in the disclosure.

The second tank pressure-reduction mechanism 38B reduces the internal pressure PI2 in the second hydrogen fuel tank 2B. The second tank pressure-reduction mechanism 38B includes a second pressure regulating pipe 381B, a second relief pipe 382B, a second pressure regulating valve 383B, and a second relief valve 384B. The second pressure regulating pipe 381B and the second relief pipe 382B are arranged in parallel. The second tank pressure-reduction mechanism 38B has the same structure and the same functionality as the first tank pressure-reduction mechanism 38A described above, and thus, detailed description therefor will be omitted. The liquefied hydrogen LH in the second hydrogen fuel tank 2B is cooled when the second tank pressure-reduction mechanism 38B reduces the pressure in the second hydrogen fuel tank 2B. The second pressure regulating pipe 381B is an example of the "vent line" in the disclosure, and the second pressure regulating valve 383B is an example of the "pressure regulating valve" in the disclosure.

The controller 50A totally controls the parts of the fuel supply system FS. The controller 50A includes a processor and a memory. The controller 50A controls operation of electric equipment included in the fuel supply system FS by executing a predetermined program stored in the memory. The controller 50A is an example of the "controller" in the disclosure.

The controller 50A receives input of various signals including: a signal indicating the internal pressure PI1 in the first hydrogen fuel tank 2A; a signal indicating the temperature T1 of the liquefied hydrogen LH in the first hydrogen fuel tank 2A; a signal indicating the remaining amount L1 of the liquefied hydrogen LH stored in the first hydrogen fuel tank 2A; a signal indicating the internal pressure PI2 in the second hydrogen fuel tank 2B; a signal indicating the temperature T2 of the liquefied hydrogen LH in the second hydrogen fuel tank 2B; and a signal indicating the remaining amount L2 of the liquefied hydrogen LH stored in the second hydrogen fuel tank 2B.

Besides, the controller 50A outputs, to the switch valve 25, a switch signal to switch the connection destination of the third supply pipe 243 to one of the first supply pipe 241 and the second supply pipe 242. The controller 50A outputs, to the first tank pressure-increase mechanism 36A, a pressure-increase signal to increase the pressure in the first hydrogen fuel tank 2A. The controller 50A outputs, to the first tank pressure-reduction mechanism 38A, a pressure-reduction signal to reduce the pressure in the first hydrogen fuel tank 2A. The controller 50A outputs, to the second tank pressure-increase mechanism 36B, a pressure-increase signal to increase the pressure in the second hydrogen fuel tank 2B. The controller 50A outputs, to the second tank pressure-reduction mechanism 38B, a pressure-reduction signal to reduce the pressure in the second hydrogen fuel tank 2B. The controller 50A outputs, to the vaporizer 30, a signal to adjust the heat amount of the vaporizer 30.

The fuel supply system FS having the configuration described above enables the switch valve 25 to switch the connection destination of the third supply pipe 243 to one of the first supply pipe 241 and the second supply pipe 242. This configuration consequently allows the switch valve 25 to switch between supply of the liquefied hydrogen LH in the first hydrogen fuel tank 2A to the booster pump 16 and supply of the liquefied hydrogen LH in the second hydrogen fuel tank 2B to the booster pump 16.

The controller 50A can switch the first hydrogen fuel tank 2A between a fuel supply phase of supplying the liquefied hydrogen LH stored in the first hydrogen tank to the booster pump 16 and a temperature restoring phase of cooling the liquefied hydrogen LH in the first hydrogen fuel tank. Similarly, the controller 50A can switch the second hydrogen fuel tank 2B between a fuel supply phase of supplying the liquefied hydrogen LH stored in the second hydrogen fuel tank to the booster pump 16 and a temperature restoring phase of cooling the liquefied hydrogen LH in the second hydrogen fuel tank.

In the temperature restoring phase, when the liquefied hydrogen LH in the first hydrogen fuel tank 2A is cooled, the liquefied hydrogen LH comes to a sub-cooling state. The sub-cooling state means a state where the liquefied hydrogen LH in the hydrogen fuel tank has a temperature lower than a saturation temperature. Subsequently, when the first hydrogen fuel tank 2A is switched from the temperature restoring phase to the fuel supply phase, the liquefied hydrogen LH in the sub-cooling state in the first hydrogen fuel tank 2A is supplied to the booster pump 16 via the main pipe 24. The liquefied hydrogen LH in the sub-cooling state has a saturated vapor pressure having been reduced. Thus, the net positive suction head available, i.e., the NPSHa, becomes higher at an inlet of the booster pump 16. This results in reducing occurrence of cavitation attributed to suction of the liquefied hydrogen LH through the inlet of the booster pump 16. Similarly, concerning the second hydrogen fuel tank 2B, the liquefied hydrogen LH stored in the second hydrogen fuel tank 2B is cooled and the relevant pressure is thereafter increased in the temperature restoring phase, and the cooled liquefied hydrogen LH is supplied to the booster pump 16 in the fuel supply phase. Thus, the net positive suction head required becomes lower at the inlet of the booster pump 16. This results in achieving a reduction in occurrence of cavitation.

The controller 50A switches, on the basis of the foregoing, between a first mode where the first hydrogen fuel tank 2A is in the fuel supply phase and the second hydrogen fuel tank 2B is in the temperature restoring phase, and a second mode where the first hydrogen fuel tank 2A is in the temperature restoring phase and the second hydrogen fuel tank 2B is in the fuel supply phase. The switching enables constant supply of the liquefied hydrogen LH in the sub-cooling state, and leads to a reduction in occurrence of cavitation in the booster pump 16.

Figure 3:
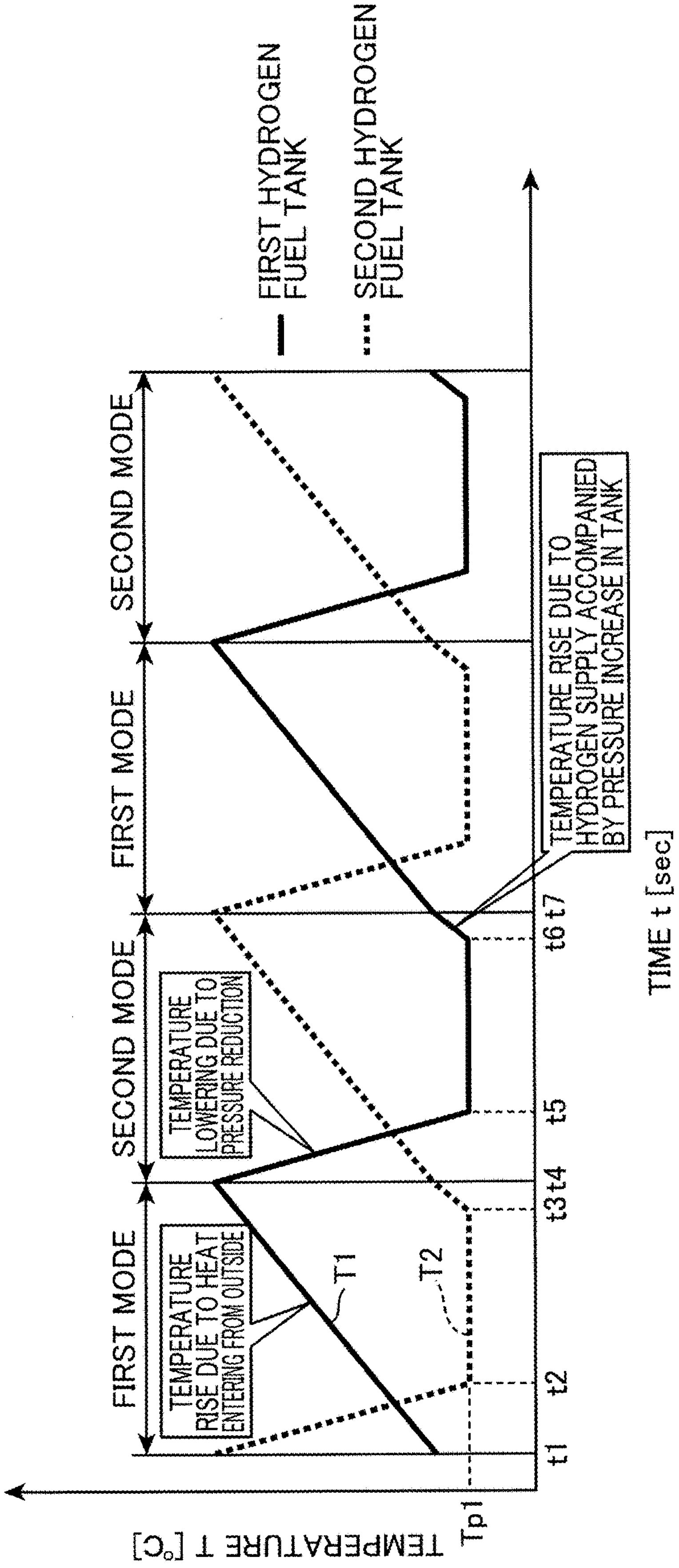
FIG. 3 is a graph showing a relation between: each of a temperature of liquefied hydrogen in a first hydrogen fuel tank and a temperature of liquefied hydrogen in a second hydrogen fuel tank; and a time.
Figure 4:
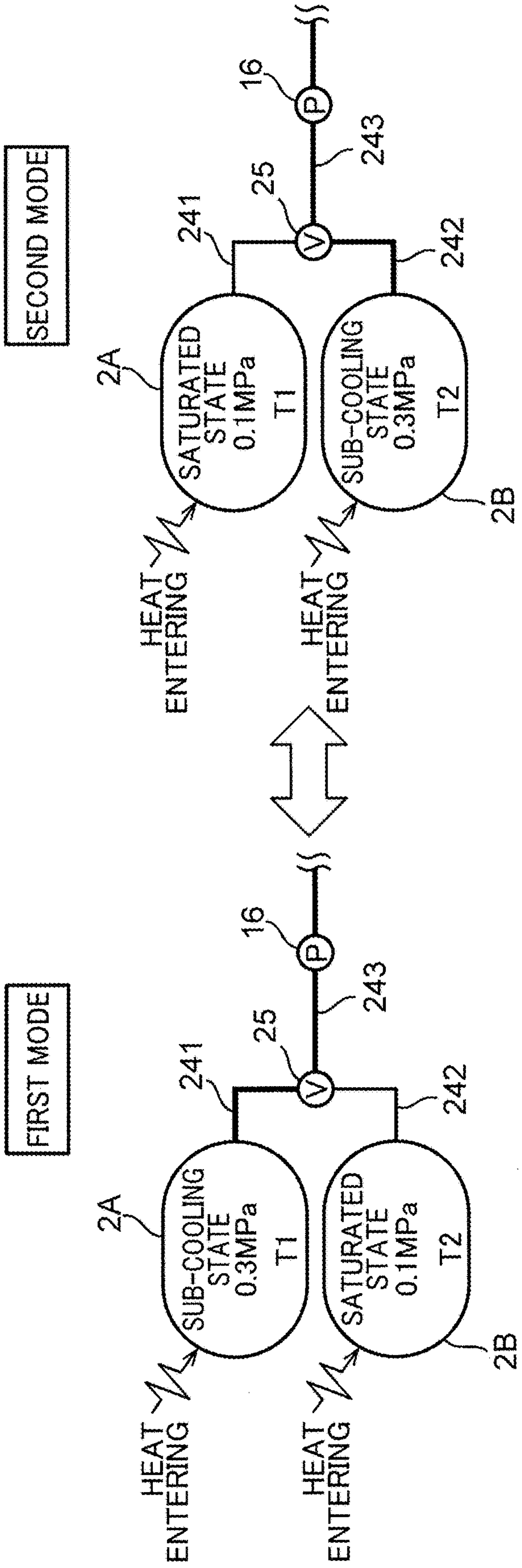
FIG. 4 illustrates supply of the liquefied hydrogen in a first mode and a second mode in FIG. 2.

FIG. 3 is a graph showing a relation between: each of the temperature T1 [° C.] of the liquefied hydrogen LH in the first hydrogen fuel tank 2A and the temperature T2 [° C.] of the liquefied hydrogen LH in the second hydrogen fuel tank 2B; and a time t [sec]. FIG. 4 illustrates supply of the liquefied hydrogen LH in the first mode and the second mode.

In FIG. 3, a horizontal axis denotes the time t [sec] and a vertical axis denotes the temperature T1 [° C.] of the liquefied hydrogen LH in the first hydrogen fuel tank 2A and the temperature T2 [° C.] of the liquefied hydrogen LH in the second hydrogen fuel tank 2B. As shown in FIG. 3, the first mode and the second mode are alternately switched.

In the first mode shown in FIG. 3, the first hydrogen fuel tank 2A comes to the fuel supply phase of supplying the liquefied hydrogen LH in the first hydrogen fuel tank 2A to the booster pump 16. In the first mode, the second hydrogen fuel tank 2B comes to the temperature restoring phase of cooling the liquefied hydrogen LH in the second hydrogen fuel tank 2B and thereafter increasing the pressure thereof. At this time, as illustrated on the left of FIG. 4, the liquefied hydrogen LH in the first hydrogen fuel tank 2A is supplied to the booster pump 16 via the first supply pipe 241, the switch valve 25, and the third supply pipe 243.

In the second mode shown in FIG. 3, the first hydrogen fuel tank 2A comes to the temperature restoring phase of cooling the liquefied hydrogen LH in the first hydrogen fuel tank 2A and thereafter increasing the pressure thereof. In the second mode, the second hydrogen fuel tank 2B comes to the fuel supply phase of supplying the liquefied hydrogen LH in the second hydrogen fuel tank 2B to the booster pump 16. At this time, as illustrated on the right of FIG. 4, the liquefied hydrogen LH in the second hydrogen fuel tank 2B is supplied to the booster pump 16 via the second supply pipe 242, the switch valve 25, and the third supply pipe 243.

At a start time point of the first mode, the temperature T1 of the liquefied hydrogen LH in the first hydrogen fuel tank 2A is lower than the temperature T2 of the liquefied hydrogen LH in the second hydrogen fuel tank 2B. In other words, the following relation is established: the temperature T1 of the liquefied hydrogen LH in the first hydrogen fuel tank 2A<the temperature T2 of the liquefied hydrogen LH in the second hydrogen fuel tank 2B. At a start time point of the second mode, the temperature T1 of the liquefied hydrogen LH in the first hydrogen fuel tank 2A is higher than the temperature T2 of the liquefied hydrogen LH in the second hydrogen fuel tank 2B. In other words, the following relation is established: the temperature T2 of the liquefied hydrogen LH in the first hydrogen fuel tank 2A>the temperature T2 of the liquefied hydrogen in the second hydrogen fuel tank 2B.

When the first mode starts at the time point t1 in FIG. 3, the switch valve 25 switches to supply the liquefied hydrogen LH in the sub-cooling state in the first hydrogen fuel tank 24A to the booster pump 16 via the switch valve 25. At the supplying, the temperature T1 of the liquefied hydrogen LH gradually rises due to heat entering from the outside. The second hydrogen fuel tank 2B is switched to the temperature storing phase of cooling the liquefied hydrogen LH in the second hydrogen fuel tank. Accordingly, the temperature T2 of the liquefied hydrogen LH lowers. The liquefied hydrogen LH in the second hydrogen fuel tank 2B may be cooled by reducing the pressure in the second hydrogen fuel tank 2B. In this case, when the second tank pressure-reduction mechanism 38B is operated to reduce the internal pressure PI2, the temperature T2 of the liquefied hydrogen LH lowers.

At the time point t2 in FIG. 3, the temperature T2 of the liquefied hydrogen LH in the second hydrogen fuel tank 2B lowers to a predetermined temperature Tp1 set in advance. After the time point t2, the temperature T2 is kept at the predetermined temperature Tp1. The temperature of the liquefied hydrogen LH in the second hydrogen fuel tank 2B may be kept by regulating the pressure in the second hydrogen fuel tank 2B to a certain pressure. The state at the time point t2 in FIG. 3 corresponds to the state on the left of FIG. 4, that is, the sub-cooling state at, for example, the internal pressure PI1 of around 0.3 MPa in the first hydrogen fuel tank 2A and the saturated state at, for example, the internal pressure PI2 of around 0.1 MPa in the second hydrogen fuel tank 2B. At the time point t3, that is, immediately before the finish of the first mode, the pressure in the second hydrogen fuel tank 2B is increased, i.e., the internal pressure PI2 is increased, in advance of proceeding to the fuel supply phase in transition of the second hydrogen fuel tank 2B from the temperature restoring phase to the fuel supply phase. The second tank pressure-increase mechanism 36B is operated to enable the increase in the pressure in the second hydrogen fuel tank 2B. The pressure in the second hydrogen fuel tank 2B is increased in a short time period from the time point t3 to the time point t4 in FIG. 4. At this time, hydrogen gas is supplied into the second hydrogen fuel tank 2B. Thus, the temperature T2 of the liquefied hydrogen LH slightly rises and the liquefied hydrogen LH comes to the sub-cooling state.

At the time point t4 in FIG. 3, the mode is switched from the first mode to the second mode. Here, the switch valve 25 switches to supply the liquefied hydrogen LH in the sub-cooling state in the second hydrogen fuel tank 2B to the booster pump 16 via the switch valve 25. At the supplying, the temperature T2 of the liquefied hydrogen LH gradually rises due to heat entering from the outside. The first hydrogen fuel tank 2A is switched to the temperature restoring phase so that the liquefied hydrogen LH in the first hydrogen fuel tank is cooled. Accordingly, the temperature T1 of the liquefied hydrogen LH lowers. The liquefied hydrogen LH in the first hydrogen fuel tank 2A may be cooled by reducing the pressure in the first hydrogen fuel tank 2A. In this case, when the first tank pressure-reduction mechanism 38A is operated to reduce the internal pressure PI1, the temperature T1 of the liquefied hydrogen LH lowers.

At the time point t5 in FIG. 3, the temperature T1 of the liquefied hydrogen LH in the first hydrogen fuel tank 2A lowers to the predetermined temperature Tp1. After the time point t5, the temperature T1 is kept at the predetermined temperature Tp1. The temperature of the liquefied hydrogen LH in the first hydrogen fuel tank 2A may be kept by regulating the pressure in the first hydrogen fuel tank 2A to a certain pressure. The state at the time point t5 in FIG. 3 corresponds to the state on the right of FIG. 4, that is, the saturated state at, for example, the internal pressure PI1 of around 0.1 MPa in the first hydrogen fuel tank 2A and the sub-cooling state at, for example, the internal pressure PI2 of around 0.3 MPa in the second hydrogen fuel tank 2B. At the time point t6, that is, immediately before the finish of the second mode, the pressure in the first hydrogen fuel tank 2A is increased, i.e., the internal pressure PI1 is increased, in advance of proceeding to the fuel supply phase in transition of the first hydrogen fuel tank 2A from the temperature restoring phase to the fuel supply phase. The first tank pressure-increase mechanism 36A is operated to enable the increase in the pressure in the first hydrogen fuel tank 2A. The pressure in the first hydrogen fuel tank 2A is increased in a short time period from the time point t6 to the time point t7. At this time, hydrogen gas is supplied into the first hydrogen fuel tank 2A. Thus, the temperature T1 of the liquefied hydrogen LH slightly rises, and the liquefied hydrogen LH comes to the sub-cooling state.

After the time point t7, the same operation as the operation executed after the time point t1 is repeated. Consequently, repetitive switching between the first mode and the second mode enables constant supply of the liquefied hydrogen LH in the sub-cooling state to the booster pump 16. This allows the net positive suction head available, i.e., NPSHa, to become higher, resulting in a reduction in occurrence of cavitation.

Specific Examples of Control

Hereinafter, specific examples of control in the fuel supply system FS to be executed by the controller 50A will be described in detail. The controller 50A appropriately controls a switching timing of switching between the first mode and the second mode, that is, controls a switching timing by the switch valve 25. The controller 50A further controls the mode for each of the first hydrogen fuel tank 2A and the second hydrogen fuel tank 2B in the temperature restoring phase. The controller 50A controls the first pressure regulating valve 383A, the second pressure regulating valve 383B, and the switch valve 25 to switch between the first mode and the second mode.

The controller 50A switches between the first mode and the second mode on the basis of the temperature T1 of the liquefied hydrogen LH in the first hydrogen fuel tank 2A measured by the first temperature sensor 42A and the temperature T2 of the liquefied hydrogen LH in the second hydrogen fuel tank 2B measured by the second temperature sensor 42B. For instance, the controller 50A switches to the second mode when the temperature T1 of the liquefied hydrogen LH in the first hydrogen fuel tank 2A is a first threshold K1 or higher, and switches to the first mode when the temperature T2 of the liquefied hydrogen LH in the second hydrogen fuel tank 2B is the first threshold K1 or higher. The first threshold K1 is obtained in advance experimentally or by design, and is set to, for example, a threshold of a temperature at which cavitation may occur in the booster pump 16. In this manner, the liquefied hydrogen LH cooled enough to prevent such cavitation is supplied to the booster pump 16.

The controller 50A is configured to cool the liquefied hydrogen LH in the second hydrogen fuel tank 2B and lower the temperature T2 of the liquefied hydrogen LH in the first mode. Specifically, the controller 50A operates the second tank pressure-reduction mechanism 38B to reduce the pressure in the second hydrogen fuel tank 2B and cool the liquefied hydrogen LH. More specifically, the controller 50A is configured to open the second pressure regulating valve 383B of the second tank pressure-reduction mechanism 38B to reduce the pressure in the second hydrogen fuel tank 2B. In addition, the controller 50A operates the second tank pressure-increase mechanism 36B to increase the pressure in the second hydrogen fuel tank 2B when determining a specific time point that is immediately before the switching to the second mode on the basis of the temperature T1 of the liquefied hydrogen LH or an elapsed time period from the start point of the first mode.

The controller 50A is configured to cool the liquefied hydrogen LH in the first hydrogen fuel tank 2A and lower the temperature T1 of the liquefied hydrogen LH in the second mode. Specifically, the controller 50A operates the first tank pressure-reduction mechanism 38A to reduce the pressure in the first hydrogen fuel tank 2A and cool the liquefied hydrogen LH. More specifically, the controller 50A is configured to open the first pressure regulating valve 383A of the first tank pressure-reduction mechanism 38A to reduce the pressure in the first hydrogen fuel tank 2A. In addition, the controller 50A operates the first tank pressure-increase mechanism 36A to increase the pressure in the first hydrogen fuel tank 2A when determining a specific time point that is immediately before the switching to the first mode on the basis of the temperature T2 of the liquefied hydrogen LH or an elapsed time period from a start time point of the second mode.

Figure 5:
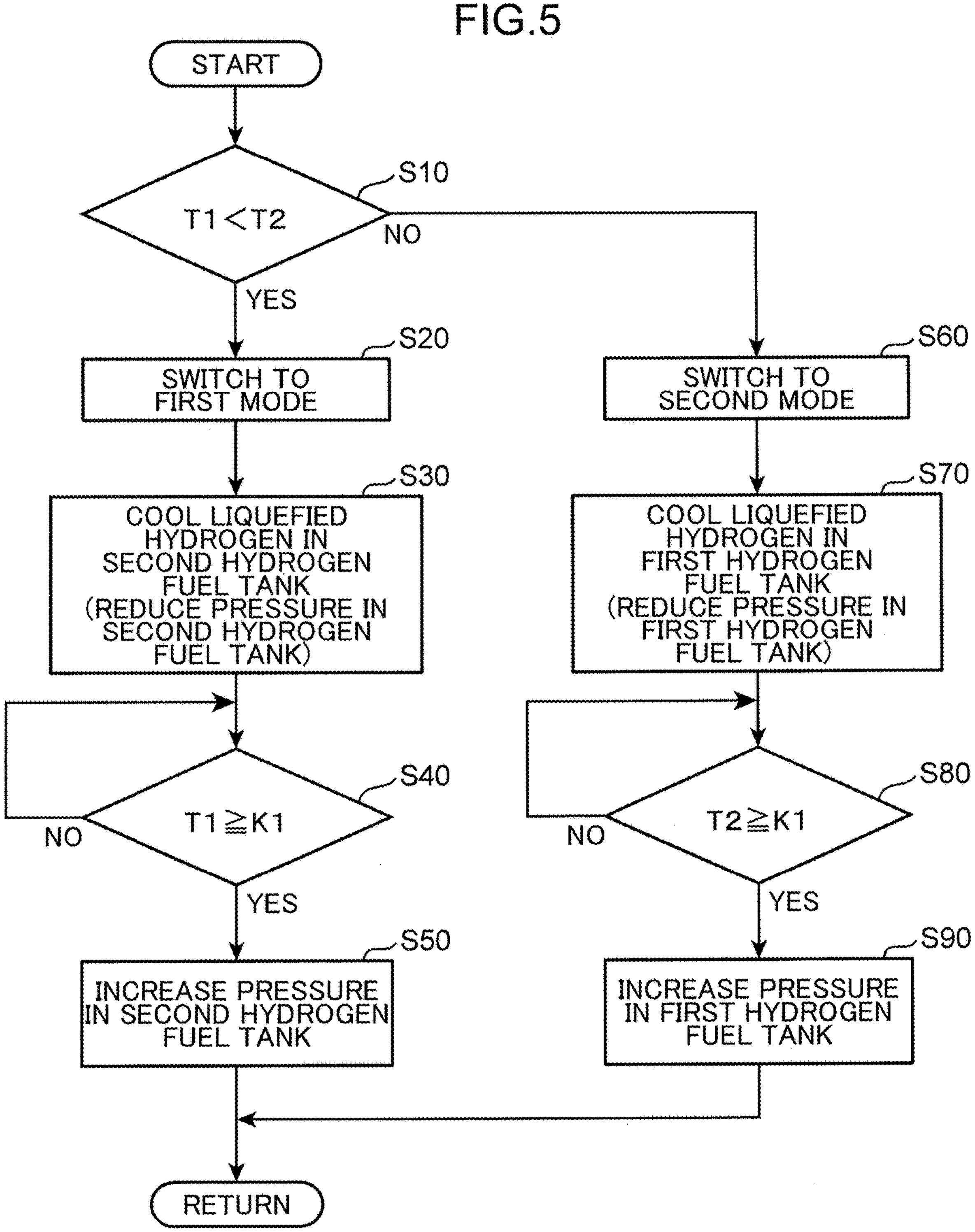
FIG. 5 is a flowchart for explanation of a control operation by a controller in FIG. 2 in the fuel supply system.

FIG. 5 is a flowchart showing a control operation by the controller 50A in the fuel supply system FS. The controller 50A repetitively executes the operation shown in the flowchart in FIG. 5 in a predetermined sampling period.

First, the controller 50A compares the temperature T1 of the liquefied hydrogen LH in the first hydrogen fuel tank 2A and the temperature T2 of the liquefied hydrogen LH in the second hydrogen fuel tank 2B with each other, and determines whether the temperature T1 is lower than the temperature T2 (step S10). When the temperature T1 is lower than the temperature T2 (Yes in step S10), the controller 50A operates the switch valve 25 to switch to the first mode where the liquefied hydrogen LH in the first hydrogen fuel tank 2A is supplied to the booster pump 16 (step S20). Subsequently, the controller 50A cools the liquefied hydrogen LH in the second hydrogen fuel tank 2B and lowers the temperature T2 of the liquefied hydrogen LH (step S30). When the temperature T2 of the liquefied hydrogen in the second hydrogen fuel tank 2B lowers to the predetermined temperature Tp1, the temperature is kept at the predetermined temperature. Next, the controller 50A determines whether the temperature T1 of the liquefied hydrogen LH in the first hydrogen fuel tank 2A reaches the first threshold K1 or higher (step S40). When the temperature T1 is lower than the first threshold K1 (NO in step S40), the controller 50A returns to step S40 and repeats the determination until the temperature T1 reaches the first threshold K1 or higher. When the temperature T1 is the first threshold K1 or higher (YES in step S40), the controller 50A increases the pressure in the second hydrogen fuel tank 2B to a predetermined pressure before switching the first hydrogen fuel tank 2A to the temperature restoring phase inside, and returns to step S10 (step S50).

When the temperature T1 of the liquefied hydrogen LH in the first hydrogen fuel tank 2A is higher than the temperature T2 of the liquefied hydrogen LH in the second hydrogen fuel tank 2B in step S10 (NO in step S10), the controller 50A operates the switch valve 25 to switch to the second mode where the liquefied hydrogen LH in the second hydrogen fuel tank 2B is supplied to the booster pump 16 (step S60). Subsequently, the controller 50A cools the liquefied hydrogen LH in the first hydrogen fuel tank 2A and lowers the temperature T1 of the liquefied hydrogen LH (step S70). When the temperature T1 of the liquefied hydrogen LH in the first hydrogen fuel tank 2A lowers to the predetermined temperature Tp1, the temperature is kept at the predetermined temperature. Next, the controller 50A determines whether the temperature T2 of the liquefied hydrogen LH in the second hydrogen fuel tank 2B reaches the first threshold K1 or higher (step S80). When the temperature T2 is lower than the first threshold K1 (NO in step S80), the controller 50A returns to step S80, and repeats the determination until the temperature T2 reaches the first threshold K1 or higher. When the temperature T2 reaches the first threshold K1 or higher (YES in step S80), the controller 50A increases the pressure in the first hydrogen fuel tank 2A to the predetermined pressure before switching the second hydrogen fuel tank 2B to the temperature restoring phase inside, and returns to step S10 (step S90).

In another control, the controller 50A may switch between the first mode and the second mode on the basis of the remaining amount L1 of the liquefied hydrogen LH in the first hydrogen fuel tank 2A and the remaining amount L2 of the 1 LH in the second hydrogen fuel tank 2B.

Second Embodiment

Figure 6:
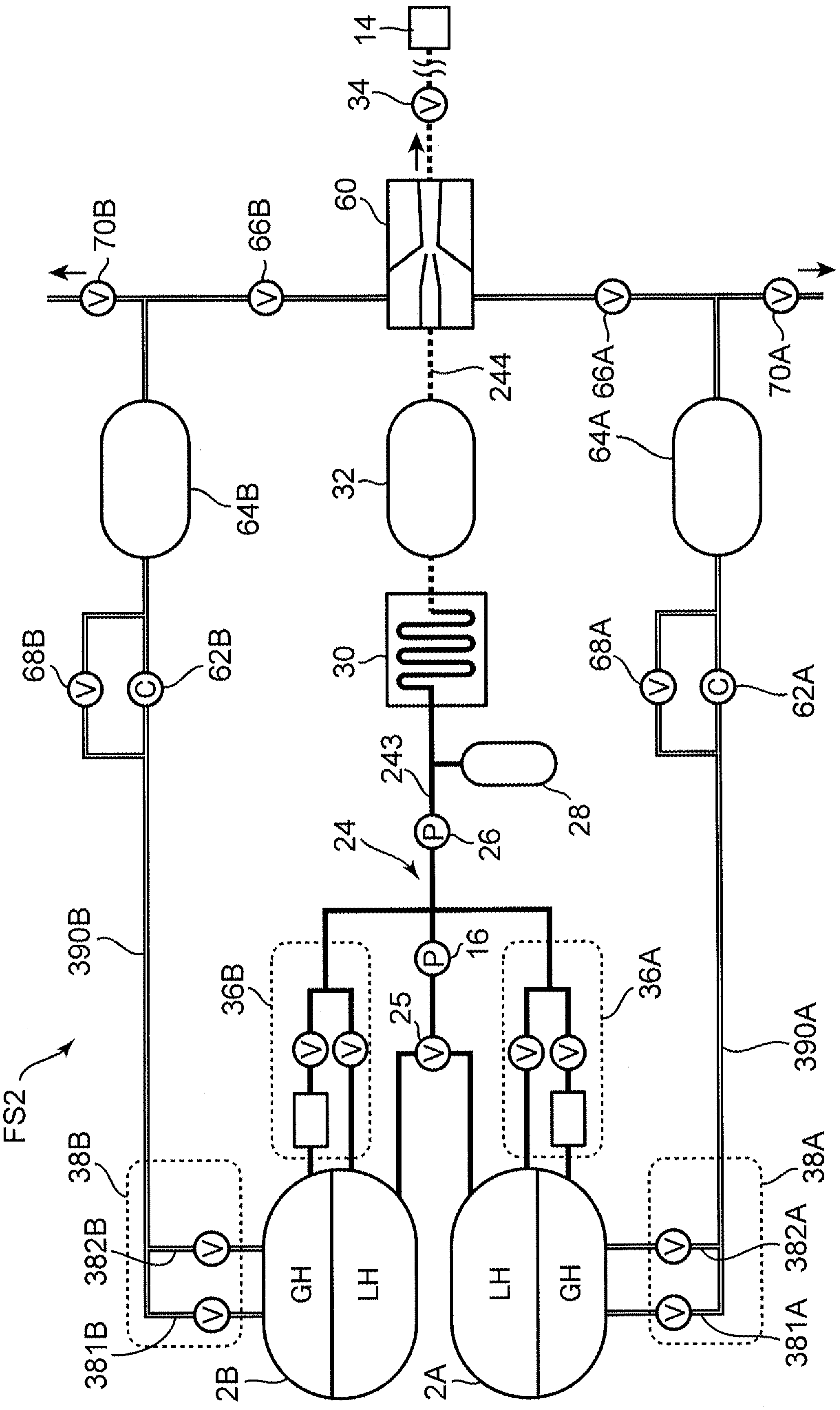
FIG. 6 is a system diagram illustrating a configuration of a fuel supply system in a second embodiment.

FIG. 6 is a system diagram illustrating a configuration of a fuel supply system FS2 in the second embodiment. The fuel supply system FS2 additionally includes an ejector 60 in comparison with the fuel supply system FS described above. In FIG. 6, structural components which are the same as those in the fuel supply system FS are given the same reference numerals or signs and the description therefor will be omitted. FIG. 6 further omits illustration of the sensors and the controller 50A. In the description below, structural components newly added to the fuel supply system FS will be described.

The fuel supply system FS2 includes the ejector 60 at a downstream position on a fourth supply pipe 244. The ejector 60 communicates with an outlet of a booster pump 16 via a third supply pipe 243 and the fourth supply pipe 244. The ejector 60 is a device that ejects hydrogen gas from a nozzle at a high speed, and takes in and sends out low-pressure hydrogen gas. The low-pressure hydrogen gas ejected by the ejector 60 is supplied to an engine combustor 14.

The fuel supply system FS2 further includes a first vent pipe 390A that connects a first hydrogen fuel tank 2A and the ejector 60 to each other. The first vent pipe 390A includes a first pressure regulating pipe 381A and a first relief pipe 382A of a first tank pressure-reduction mechanism 38A. A first compressor 62A and a first sub-buffer tank 64A are located on a passage of the first vent pipe 390A. Besides, a first bypass valve 68A is arranged in parallel to the first compressor 62A. The first vent pipe 390A branches downstream of the first sub-buffer tank 64A into two pipes, and one pipe leads to the ejector 60 and the other pipe leads to outside. A first on-off valve 66A is located on the one pipe. A first vent valve 70A is located on the other pipe. The first sub-buffer tank 64A is an example of the "sub-buffer tank" in the disclosure, the first on-off valve 66A is an example of the "on-off valve" in the disclosure, and the first vent pipe 390A is an example of the "vent line" in the disclosure.

The first compressor 62A compresses the hydrogen gas having flowed into the first vent pipe 390A. In the shortage of the pressure of the hydrogen gas, the controller 50A operates the first compressor 62A to compress the hydrogen gas. Such compression of the hydrogen gas by the first compressor 62A provides an advantageous effect that the first sub-buffer tank 64A can have a smaller capacity.

The first bypass valve 68A is arranged in parallel to the first compressor 62A and defines a detour for the hydrogen gas. The first bypass valve 68A opens to allow a part of or a whole of the hydrogen gas to flow downstream without passing through the first compressor 62A.

The first sub-buffer tank 64A is located downstream of the first compressor 62A. The first sub-buffer tank 64A is provided to temporarily store the hydrogen gas flowing in the first vent pipe 390. The first sub-buffer tank 64A is provided to reliably keep the hydrogen gas and enable stable supply of the hydrogen gas to the ejector 60.

The first on-off valve 66A is located between the first sub-buffer tank 64A and the ejector 60 on the first vent pipe 390A. The first on-off valve 66A is opened or closed to switch a communication state between the first vent pipe 390A and the ejector 60. Specifically, when the first on-off valve 66A is opened, communication between the first vent pipe 390A and the ejector 60 is established. Conversely, when the first on-off valve 66A is closed, the communication between the first vent pipe 390A and the ejector 60 is blocked.

The first vent valve 70A is provided to discharge a part of or a whole of the hydrogen gas flowing in the first vent pipe 390A outside. For instance, the first vent valve 70A is opened to discharge a part of or a whole of the hydrogen gas flowing in the first vent pipe 390A outside. Conversely, the first vent valve 70A is closed to avoid discharging the hydrogen gas flowing in the first vent outside.

The controller 50A appropriately switches the first bypass valve 68A, the first on-off valve 66A, and the first vent valve 70A. For instance, the controller 50A is configured to open the first vent valve 70A and close the first on-off valve 66A to discharge the hydrogen gas flowing in the first vent pipe 390A outside. Alternatively, the controller 50A is configured to close the first vent valve 70A and open the first on-off valve 66A to supply vaporized gas of liquefied hydrogen LH generated in the first hydrogen fuel tank 2A to the ejector 60 via the first vent pipe 390A. The hydrogen gas supplied to the ejector 60 via the first vent pipe 390A is absorbed into high speed air current generated in the ejector 60 and supplied to the engine combustor 14. As a result, the hydrogen gas discharged from the first hydrogen fuel tank 2A via the first vent pipe 390A, that is, boil-off gas in surplus, can be effectively utilized.

The fuel supply system FS2 further includes a second vent pipe 390B that connects a second hydrogen fuel tank 2B and the ejector 60 to each other. A second compressor 62B and a second sub-buffer tank 64B are located on a passage of the second vent pipe 390B. Besides, a second bypass valve 68B is arranged in parallel to the second compressor 62B. The second vent pipe 390B branches downstream of the second sub-buffer tank 64B into two pipes, and one pipe leads to the ejector 60 and the other pipe leads to the outside. A second on-off valve 66B is located on the one pipe. A second vent valve 70B is located on the other pipe. The second sub-buffer tank 64B is an example of the "sub-buffer tank" in the disclosure, the second on-off valve 66B is an example of the "on-off valve" in the disclosure, and a second vent pipe 390B is an example of the "vent line" in the disclosure.

Each component described above has the same structure and the same functionality as the structure and the functionality of each of the first compressor 62A, the first sub-buffer tank 64A, the first on-off valve 66A, the first bypass valve 68A, and the first vent valve 70A, and thus, description therefor will be omitted.

Third Embodiment

Figure 7:
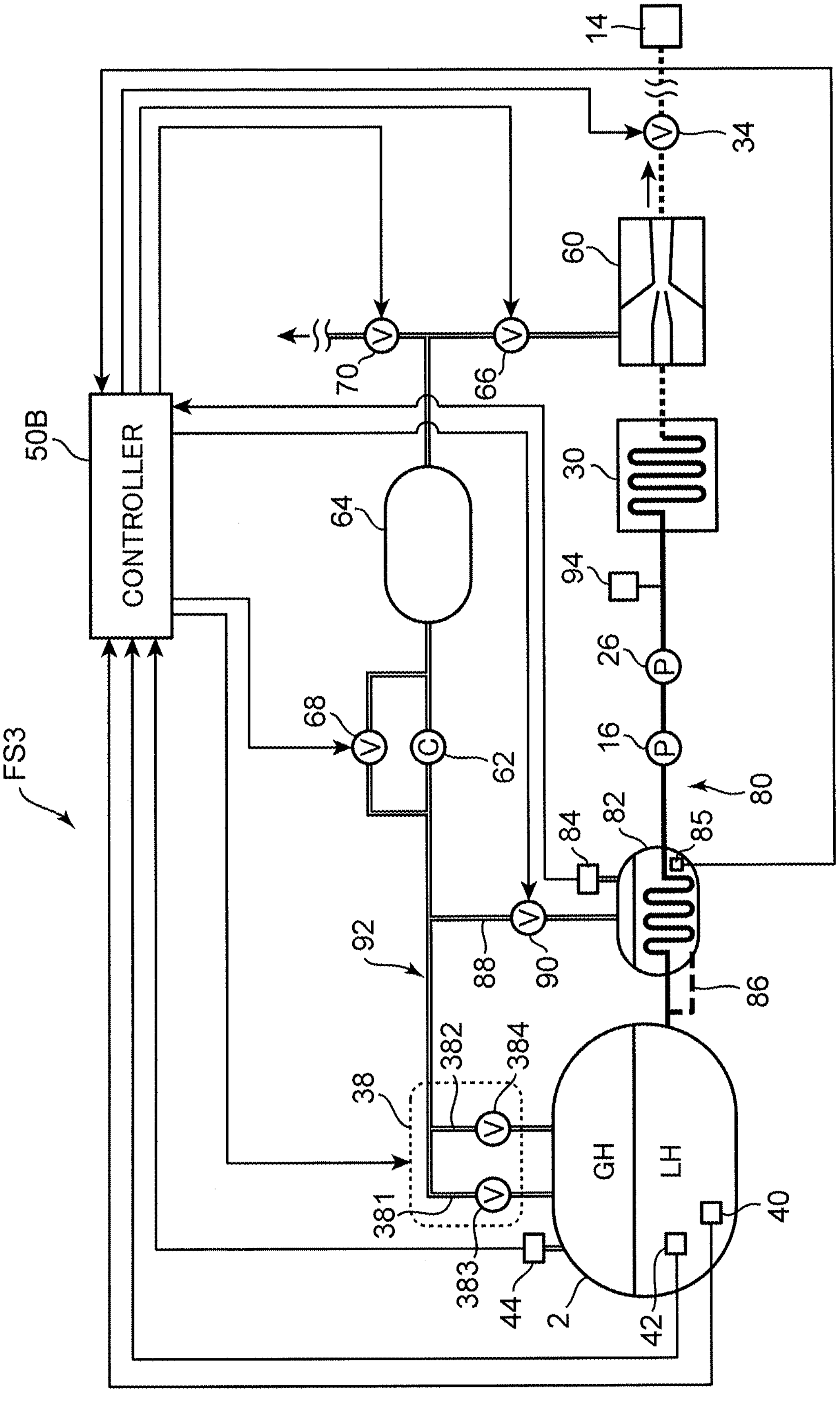
FIG. 7 is a system diagram illustrating a configuration of a fuel supply system in a third embodiment.

FIG. 7 is a system diagram illustrating a configuration of a fuel supply system FS3 in the third embodiment. When the fuel supply system FS3 is compared with the above-described fuel supply systems FS1, FS2, the fuel supply system FS3 includes a single hydrogen fuel tank 2. The fuel supply system FS3 additionally includes a cooling tank 82 as a fuel cooler between the hydrogen fuel tank 2 and a booster pump 16. Hereinafter, structural components different from those in the fuel supply systems FS1, FS2 will be mainly described.

The fuel supply system FS3 includes the cooling tank 82, the booster pump 16, an engine pump 26, and a vaporizer 30 on a passage of a main pipe 80 that connects the hydrogen fuel tank 2 and an ejector 60 to each other. The hydrogen fuel tank 2 is not basically different from the first hydrogen fuel tank 2A and the second hydrogen fuel tank 2B, and thus, description therefor will be omitted. The hydrogen fuel tank 2 includes a fuel remaining amount sensor 40 that measures a remaining amount L of liquefied hydrogen LH in the hydrogen fuel tank 2, a temperature sensor 42 that measures a temperature T of the liquefied hydrogen LH stored in the hydrogen fuel tank 2, and a pressure sensor 44 that measures an internal pressure PI in the hydrogen fuel tank 2. The structure and the positional arrangement of the booster pump 16, the engine pump 26, the vaporizer 30, and the ejector 60 are the same as the structure and the positional arrangement in the fuel supply system FS2, and thus, description therefor will be omitted.

The cooling tank 82 is located upstream of the booster pump 16 on the main pipe 80. The cooling tank 82 is filled with liquefied hydrogen LH. The cooling tank 82 is filed with the liquefied hydrogen LH inside via a filling pipe 86 connected to the main pipe 80. The liquefied hydrogen LH filling the cooling tank 72 is cooled. Thus, the liquefied hydrogen LH passing through the cooling tank 82 inside exchanges heat with the liquefied hydrogen LH filling the cooling tank 82 and is cooled accordingly. The cooling tank 82 includes a pressure sensor 84 that measures an internal pressure PIc in the cooling tank 82, and a temperature sensor 85 that measures a temperature Tc of the liquefied hydrogen stored in the cooling tank 82. A controller 50B receives input of various signals including: a signal indicating the remaining amount L of the liquefied hydrogen LH in the hydrogen fuel tank 2; a signal indicating the temperature T of the liquefied hydrogen LH stored in the hydrogen fuel tank 2A; a signal indicating the internal pressure PI in the hydrogen fuel tank 2; a signal indicating the internal pressure PIc in the cooling tank 82; and a signal indicating the temperature Tc of the liquefied hydrogen LH in the cooling tank 82.

The cooling tank 82 is connected to a cooling pipe 88 serving as a cooling vent line. The cooling pipe 88 joins a vent pipe 92 downstream, the vent pipe being described later. The hydrogen gas in the cooling tank 82 is discharged via the cooling pipe 88 and the vent pipe 92 to reduce the internal pressure PIc being the pressure in the cooling tank 82.

A pressure regulating valve 90 is located on the cooling pipe 88. The pressure regulating valve 90 may be an electric valve having an opening degree which is adjustable. The opening degree of the pressure regulating valve 90 is adjusted in accordance with a flow rate signal output from the controller 50B.

The fuel supply system FS3 further includes the vent pipe 92 to discharge hydrogen gas, i.e., boil-off gas, vaporized in the hydrogen fuel tank 2. The vent pipe 92 has an upstream end connected to the hydrogen fuel tank 2. The vent pipe 92 branches downstream into two pipes, and one pipe leads to the ejector 60 and the other pipe leads to the outside. An on-off valve 66 is located on the one pipe. A vent valve 70 is located on the other pipe.

A tank pressure-reduction mechanism 38, a compressor 62, and a buffer tank 64 are located on the vent pipe 92. Further, a bypass valve 68 is arranged in parallel to the compressor 62.

The tank pressure-reduction mechanism 38 includes a first pipe 381, a second pipe 382, a pressure regulating valve 383 located on the first pipe, and a relief valve 384 located on the second pipe 382. The first pipe 381 and the second pipe 382 are arranged in parallel. The first pipe 381 and the second pipe 382 constitute a part of the vent pipe 92. The tank pressure-reduction mechanism 38 has the same structure and the same functionality as the first tank pressure-reduction mechanism 38A and the second tank pressure-reduction mechanism 38B, and thus, description therefor will be omitted.

The compressor 62 compresses hydrogen gas flowing in the vent pipe 92. The bypass valve 68 is arranged in parallel to the compressor 62 and defines a detour for the hydrogen gas. The buffer tank 64 temporarily stores the hydrogen gas flowing in the vent pipe 92. The on-off valve 66 is located on the one pipe branching from the vent pipe 92 downstream of the buffer tank 64 and leading to the ejector 60. The on-off valve 66 is a switch valve to switch a communication state between the vent pipe 92 and the ejector 60. The vent valve 70 is located on the other pipe branching from the vent pipe 92 downstream of the buffer tank 64 and leading to the outside. The vent valve 70 is a switch valve to switch a communication state between the vent pipe 92 and the outside. The on-off valve 66 is opened to allow the hydrogen gas vaporized in at least one of the hydrogen fuel tank 2 or the cooling tank 82 inside to be supplied to the ejector 60 via the vent pipe 92.

For instance, in a case of a small consumption amount of hydrogen in an engine combustor 14, the on-off valve 66 is closed to allow the buffer tank 64 to store the hydrogen gas. Conversely, in a case of a large consumption amount of the hydrogen in the engine combustor 14, the on-off valve 66 is opened to supply the hydrogen gas stored in the buffer tank 64 to the ejector 60. Besides, a flow rate sensor 94 is located at an inlet of the vaporizer 30 to enable control of the on-off valve 66 to open or close on the basis of a flow rate F of the liquefied hydrogen LH measured by the flow rate sensor 94. For instance, the controller 50B is configured to close the on-off valve 66 when the flow rate F of the liquefied hydrogen LH is a default value or higher, and open the on-off valve 66 when the flow rate F is lower than the default value. Alternatively, a flow rate sensor that measures a flow rate of vaporized hydrogen gas may be provided at an outlet of the vaporizer 30 to make the controller 50 control the on-off valve 66 to open or close on the basis of the flow rate measured by the flow rate sensor. When the flow rate of the hydrogen gas flowing in the vent pipe 92 is higher than expected, the vent valve 70 may be opened to discharge the hydrogen gas outside.

The controller 50B controls operation of the tank pressure-reduction mechanism 38, the bypass valve 68, the on-off valve 66, the vent valve 70, and the pressure regulating valve 90. The controller 50B is an example of the "controller" in the disclosure.

For instance, the controller 50B is configured to cool the liquefied hydrogen LH passing through the cooling tank 82 inside. The controller 50B is configured to cool the liquefied hydrogen LH in the main pipe 80 that has flowed out of the hydrogen fuel tank 2. Specifically, the controller 50B is configured to cool the liquefied hydrogen LH in the cooling tank 82 so that the temperature Tc of the liquefied hydrogen LH filling the cooling tank 82 is lower than the temperature T of the liquefied hydrogen LH in the hydrogen fuel tank 2.

For cooling of the liquefied hydrogen LH in the cooling tank 82, the controller 50B controls the internal pressure PIc being the pressure in the cooling tank 82 so that the internal pressure PIc in the cooling tank 82 is lower than the internal pressure PI in the hydrogen fuel tank 2. The internal pressure PI in the hydrogen fuel tank 2 is set to, for example, 0.3 MPa, and the temperature TL1 of the liquefied hydrogen LH is set to around −248° C. In contrast, the controller 50B controls the internal pressure PIc in the cooling tank 82 to 0.1 MPa by controlling the pressure regulating valve 90. At this time, the temperature Tc of the liquefied hydrogen LH in the cooling tank 82 lowers to, for example, around −253° C., and becomes lower than the temperature T of the liquefied hydrogen LH in the hydrogen fuel tank 2. The respective numeral values are mere examples, and are appropriately changeable.

In this manner, the liquefied hydrogen LH flowing in the main pipe 80 is cooled in the cooling tank 82 to come to the sub-cooling state, and the cooled liquefied hydrogen LH is supplied to the booster pump 16. As a result, the net positive suction head available is higher at the inlet of the booster pump 16 and occurrence of cavitation attributed to suction of the liquefied hydrogen LH into the booster pump 16 is reduced in comparison with a configuration in which the liquefied hydrogen LH is not cooled. Heat having entered the cooling tank 82 is utilized as heat of vaporization for hydrogen.

For instance, the controller 50B is configured to open the pressure regulating valve 90 to reduce the internal pressure PIc in the cooling tank 82 when the internal pressure PIc measured by the pressure sensor 84 reaches a predetermined fourth threshold K4 or higher. The controller 50B is configured to close the pressure regulating valve 90 to increase the internal pressure PI2 in the cooling tank 82 when the internal pressure PIc reaches a predetermined fifth threshold K5 or lower. The fourth threshold K4 and the fifth threshold K5 are obtained in advance experimentally or by design. The fourth threshold K4 is, for example, set to such a value that a difference ΔTL between the temperature Tc of the liquefied hydrogen LH in the cooling tank 82 and the temperature T of the liquefied hydrogen LH in the hydrogen fuel tank 2 has a permissible value or more. The difference is expressed as "$\Delta TL=|Tc-T|$". For instance, the fifth threshold K5 is set to such a value that the temperature Tc of the liquefied hydrogen LH filling the cooling tank 82 inside may reach a lower limit value set in advance. From these perspectives, the internal pressure PIc in the cooling tank 82 is controlled to fall within a range from the fourth threshold K4 to the fifth threshold K5. The control results in adjusting the temperature Tc of the liquefied hydrogen LH in the cooling tank 82 to be lower than the temperature T of the liquefied hydrogen LH in the hydrogen fuel tank 2.

Figure 8:
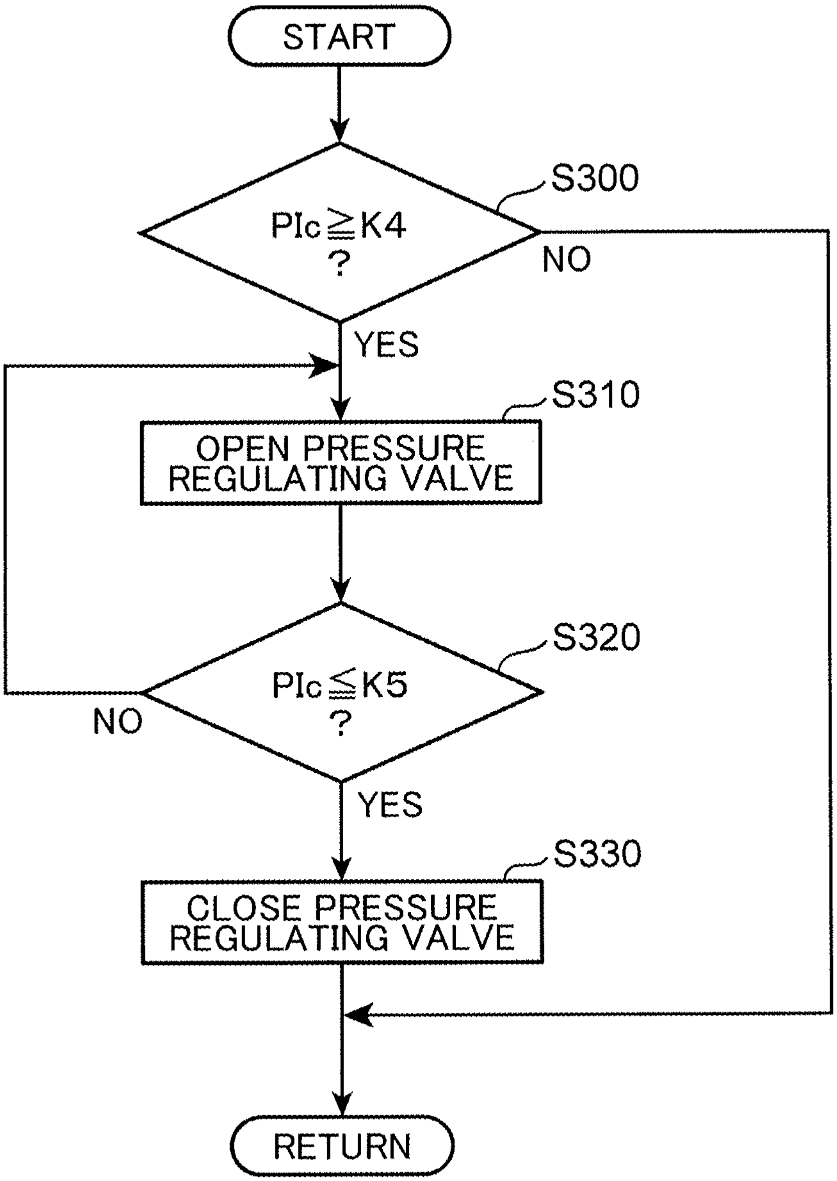
FIG. 8 is a flowchart for explanation of a control operation by a controller in the fuel supply system in the third embodiment.

FIG. 8 is a flowchart showing a control operation by the controller 50B in the fuel supply system FS3. The controller 50B repetitively executes the operation shown in the flowchart in FIG. 8 in a predetermined sampling period.

First, the controller 50B determines whether the internal pressure PIc in the cooling tank 82 reaches the fourth threshold K4 or higher (step S300). When the internal pressure PIc is lower than the fourth threshold K4 (NO in step S300), the controller 50B executes step S300 and the subsequent steps in the flowchart again. When the internal pressure PIc is the fourth threshold K4 or higher (YES in step S300), the controller 50B opens the pressure regulating valve 90 to reduce the internal pressure PIc (step S310). Subsequently, the controller 50B determines whether the internal pressure PIc reaches the fifth threshold K5 or lower (step S320). When the internal pressure PIc is higher than the fifth threshold K5 (NO in step S320), the controller 50B returns to step S310 and continues to lower the internal pressure PIc. When the internal pressure PIc is the fifth threshold K5 or lower (YES in step S320), the controller 50B closes the pressure regulating valve 90 and returns to step S300.

Alternatively, in another control, the controller 50B may be configured to open the pressure regulating valve 90 to reduce the internal pressure PIc in the cooling tank 82 when the internal pressure PIc reaches a predetermined sixth threshold K6 or higher. The sixth threshold K6 is obtained in advance experimentally or by design. For instance, the sixth threshold K6 is set to such a value that a difference ΔTL between the temperature Tc of the liquefied hydrogen LH in the cooling tank 82 and the temperature T of the liquefied hydrogen LH in the hydrogen fuel tank 2 has a value less than a permissible value. In this manner, the temperature Tc of the liquefied hydrogen LH in the cooling tank 82 is adjusted to be always lower than the temperature T of the liquefied hydrogen in the hydrogen fuel tank 2.

Figure 9:
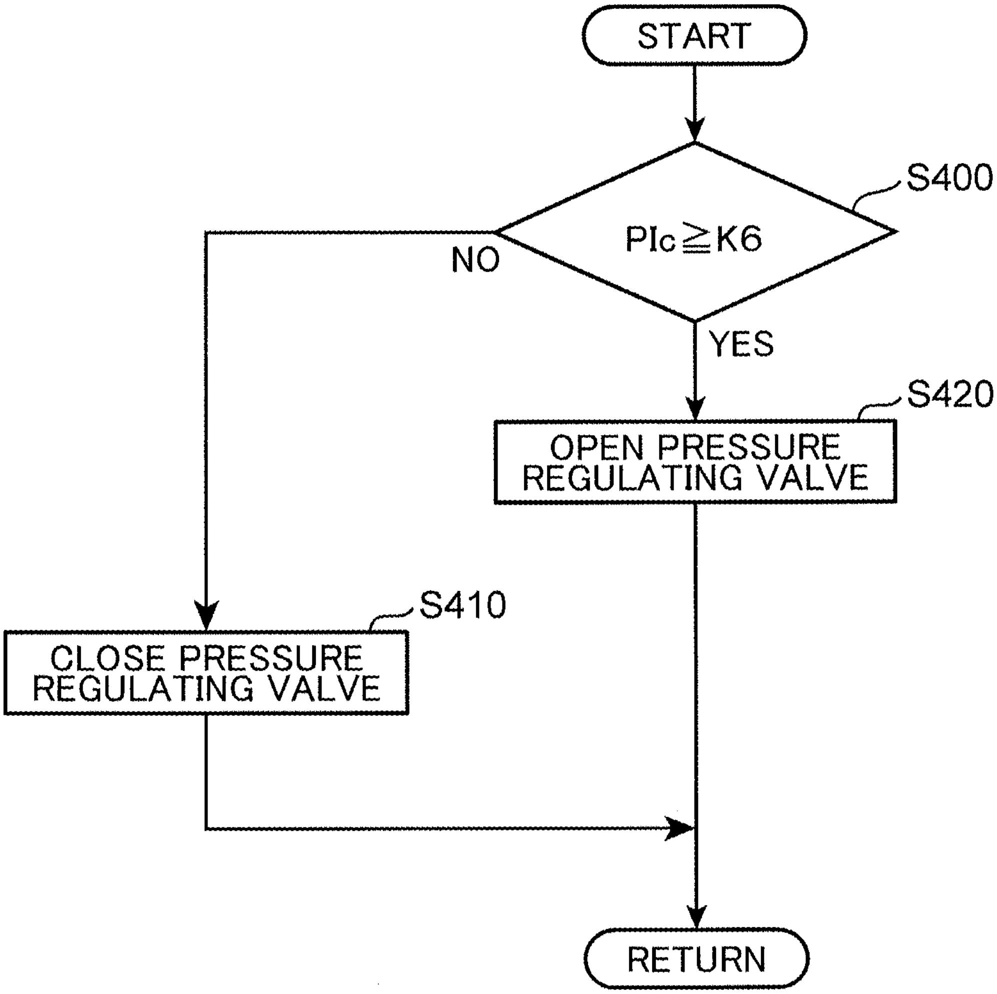
FIG. 9 is another flowchart for explanation of the control operation by the controller in the fuel supply system in the third embodiment.

FIG. 9 is another flowchart showing the control operation by the controller 50B in the fuel supply system FS3. The controller 50B repetitively executes the operation shown in the flowchart in a predetermined sampling period.

The controller 50B determines whether the internal pressure PIc in the cooling tank 82 reaches the sixth threshold K6 or higher. When the internal pressure PI2 is lower than the sixth threshold K6 (NO in step S400), the controller 50B closes the pressure regulating valve 90 (step S410) and returns to step S400. In contrast, when the internal pressure PIc is the sixth the threshold K6 or higher (YES in step S400), the controller 50B opens the pressure regulating valve 90 (step S420) and returns to step S400.

Fourth Embodiment

Figure 10:
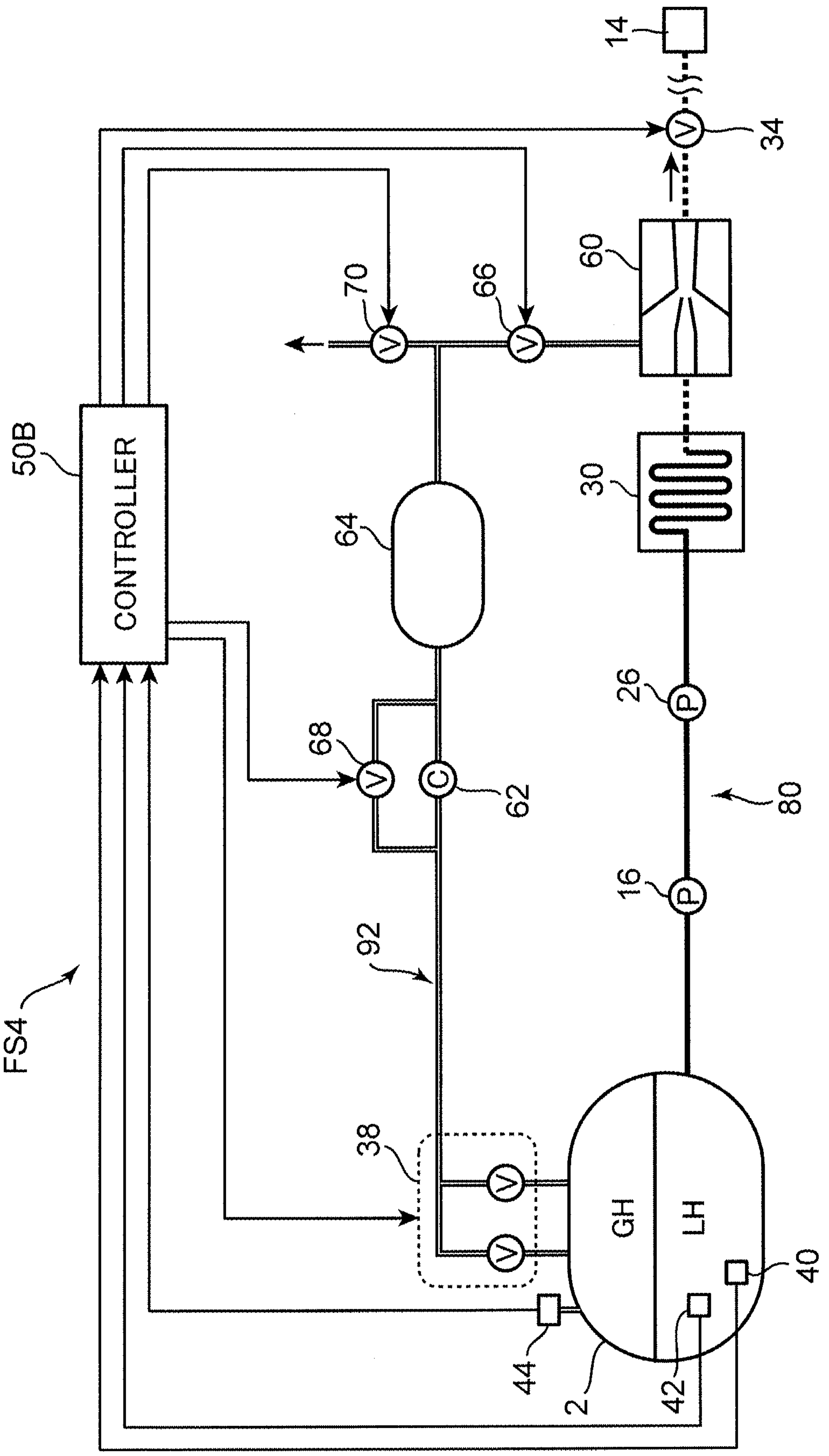
FIG. 10 is a system diagram illustrating a configuration of a fuel supply system in a fourth embodiment.

FIG. 10 is a system diagram illustrating a configuration of a fuel supply system FS4 in the fourth embodiment. The fuel supply system FS4 has a configuration corresponding to the configuration excluding the cooling tank 82 from the fuel supply system FS3 described above. The remaining structural components are equivalent to those in the fuel supply system FS3, and thus are given the same reference signs or numerals without detailed description therefor. The cooling tank 82 may be excluded in no risk of occurrence of cavitation in a booster pump 16 even without cooling liquefied hydrogen LH flowing in a main pipe 80.

Besides, as a result of supplying, to an ejector 60 via a vent pipe 92, hydrogen gas discharged from a hydrogen fuel tank 2, the fuel supply system FS4 achieves effective utilization of the hydrogen gas vaporized in the hydrogen fuel tank 2.

MODIFICATIONS

Although the fuel supply system FS includes the first hydrogen fuel tank 2A and the second hydrogen fuel tank 2B in the relevant embodiment, the present disclosure is not limited to the two hydrogen fuel tanks. Specifically, a fuel supply system may include three or more hydrogen fuel tanks including the first hydrogen fuel tank 2A and the second hydrogen fuel tank 2B. Each hydrogen fuel tank is switched between the fuel supply phase and the temperature restoring phase in this configuration as well. Moreover, the controller 50A is configured to switch, in addition to the first mode and the second mode, to a mode where the liquefied hydrogen LH stored in another hydrogen fuel tank, except the first hydrogen fuel tank 2A and the second hydrogen fuel tank 2B, is supplied to the booster pump 16. This configuration also enables supply of the cooled liquefied hydrogen LH to the booster pump 16.

Although the embodiments adopt the liquefied hydrogen LH as low-temperature liquid fuel, the present disclosure is not limited to the liquefied hydrogen LH. For example, liquefied petroleum gas (LPG), liquefied natural gas (LNG), or ammonia may be adopted as the low-temperature liquid fuel.

In the embodiments, the pressure in each of the hydrogen fuel tanks 2, 2A, 2B is increased after a part of the liquefied hydrogen LH having been sent out is vaporized, and then resultant vaporized gas is returned to hydrogen fuel tank 2, 2A, 2B. In this regard, a way of increasing the pressure in each hydrogen fuel tank 2, 2A, 2B is not limited to the aforementioned way. For instance, a fuel supply system may include an independent high-pressure gas tank and increase a pressure by making the high-pressure gas tank communicate with a hydrogen fuel tank.

Although each of the fuel supply system FS1 and the fuel supply system FS2 in the relevant embodiments includes the first hydrogen fuel tank 2A and the second hydrogen fuel tank 2B individually, the present disclosure is not necessarily limited thereto. For instance, a single hydrogen fuel tank is divided into two sections by a partition inside, and the sections may respectively serve as the first hydrogen fuel tank 2A and the second hydrogen fuel tank 2B.

Although each of the fuel supply system FS1 and the fuel supply system FS2 in the relevant embodiments is switched between the first mode and the second mode on the basis of the temperature T1, T2 of the liquefied hydrogen LH or the remaining amount L1, L2 of the liquefied hydrogen LH, the present disclosure is not limited thereto. For instance, the controller 50A may switch between the first mode and the second mode on the basis of the flow rate of the liquefied hydrogen LH sent out of the first hydrogen fuel tank 2A and the flow rate of the liquefied hydrogen LH sent out of the second hydrogen fuel tank 2B.

Although each of the fuel supply system FS1 and the fuel supply system FS2 in the relevant embodiments is switched between the first mode and the second mode by the single switch valve 25, a switch valve may include two or more valves. Specifically, a switch valve may be located on the first supply pipe 241 and another switch valve may be located on the second supply pipe 242, and a state of each switch valve may be changed to switch between the first mode and the second mode.

Although the pipe connected to the first hydrogen fuel tank 2A and the pipe connected the second hydrogen fuel tank 2B merge to lead to the single booster pump 16 in the relevant embodiments, a booster pump may be provided for the tank 2A and another booster pump may be provided for the tank 2B. In this configuration, switching is executed between a first mode where the liquefied hydrogen LH in the first hydrogen fuel tank 2A is supplied to one associated booster pump and the liquefied hydrogen LH in the second hydrogen fuel tank 2B is cooled and a second mode where the liquefied hydrogen LH in the second hydrogen fuel tank 2B is supplied to another associated booster pump and the liquefied hydrogen in the first hydrogen fuel tank 2A is cooled.

Although the engine pump 26 is located downstream of the booster pump 16 in the embodiments, the engine pump 26 may be excluded.

Although each of the fuel supply systems FS1, FS2 in the relevant embodiments includes the accumulator 28 and the buffer tank 32, at least one of the accumulator 28 or the buffer tank 32 may be excluded.

Although the vaporizer 30 heats and vaporizes the liquefied hydrogen LH by causing a heater element included therein to generate heat in the embodiments, the present disclosure is not limited to the vaporizer. For instance, a heat exchanger may be adopted in place of the vaporizer 30 to vaporize the liquefied hydrogen LH. That is, a fuel supply system can appropriately adopt any other device that vaporizes the liquefied hydrogen LH. This is also applicable to the first pressure-increase vaporizer 363A and the second pressure-increase vaporizer 363B in the same manner.

Although the fuel supply system FS3 makes the cooling tank 82 cool the liquefied hydrogen LH in the relevant embodiment, the present disclosure may adopt any other way suitable for cooling the liquefied hydrogen LH without limitation to the cooling tank 82. For instance, the fuel supply system FS3 may include a freezer, a turbine, or a heat exchanger to cool the liquefied hydrogen LH. In the case of the freezer, cooling performance of the freezer is controlled on the basis of the temperature of the main pipe 80 being contact with a heat sink.

Although each of the fuel supply systems FS1, FS2 in the relevant embodiments suspends fuel supply in the temperature restoring phase, each system may be configured to continue the fuel supply even in the temperature restoring phase. This configuration achieves prevention of temporal interruption of the fuel supply in transition between the first mode and the second mode. It is noted here that each embodiment prevents suspension of the fuel supply or a reduction in the fuel supply in the switching transition by arranging the accumulator 28 and the buffer tank 32 on the main pipe 24 and supplying the liquefied hydrogen LH accumulated in the accumulator 28 or the hydrogen gas stored in the buffer tank to the supply line 15.

Although the hydrogen fuel is supplied to the engine combustor 14 in the embodiments, a supply destination of the hydrogen fuel in the present disclosure is not limited to the engine combustor 14. For instance, the hydrogen fuel may be supplied to a fuel cell serving as a power source for a machine body, or the hydrogen fuel may be supplied to an auxiliary powering unit, that is, APU. The APU includes a small engine to be mounted independently of an engine for propulsion. Alternatively, the hydrogen fuel may be supplied as a cooling source to a device heat generator, or the hydrogen fuel may be supplied to a wing surface for boundary layer control.

Although each of the first hydrogen fuel tank 2A and the second hydrogen fuel tank 2B has the vacuum double-shell structure in the relevant embodiments, the present disclosure is not limited to the structure. For instance, each of the first hydrogen fuel tank 2A and the second hydrogen fuel tank 2B may be a heat-insulation tank to which a heat insulation material is affixed. In other words, the structure of each of the first hydrogen fuel tank 2A and the second hydrogen fuel tank 2B may be appropriately changed as long as the heat insulation is ensured.

Although a mechanical pump that utilizes an axial force of the engine is adopted in place of the engine pump 26 in the embodiments, the present disclosure is not limited to the mechanical pump. For instance, an electric pump may be adopted in place of the engine pump 26.

Although a heat exchanger that utilizes exhausted heat of the engine is adopted for the vaporizer 30, the present disclosure is not limited thereto. For instance, any other way of vaporizing the liquefied hydrogen LH, e.g. a way of utilizing heat generated from an electric heater, may be appropriately employed instead.

Although the first pressure regulating pipe 381A and the first relief pipe 382A communicate with the outside air in the relevant embodiments, the present disclosure is not limited thereto. For instance, each pipe may be connected to a storage tank, and the storage tank may store vaporized gas. Similarly, the second pressure regulating pipe 381B and the second relief pipe 382B may not necessarily communicate with the outside air.

Although each of the vent pipe 92, the first vent pipe 390A, and the second vent pipe 390B leads to the ejector 60 and the outside in the relevant embodiments, each component may not lead to the outside.

The functionality of the elements disclosed herein may be implemented using circuitry or processing circuitry which includes general purpose processors, special purpose processors, integrate circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

SUMMARY OF THE DISCLOSURE

An aircraft according to a first feature of the present disclosure that adopts low-temperature liquid fuel as an energy source includes: a first tank and a second tank each storing low-temperature liquid fuel; a pump that receives supply of the low-temperature liquid fuel from the first tank and the second tank; and a controller. Each of the first tank and the second tank is switched between a fuel supply phase of supplying the low-temperature liquid fuel to the pump and a temperature restoring phase of cooling the low-temperature liquid fuel in each of the first tank and the second tank. The controller switches between a first mode where the first tank is in the fuel supply phase and the second tank is in the temperature restoring phase, and a second mode where the first tank is in the temperature restoring phase and the second tank is in the fuel supply phase.

The first feature enables constant supply of the low-temperature liquid fuel cooled sufficiently to the pump by switching between the first mode and the second mode. This configuration thus allows the net positive suction head required to be lower at an inlet of the pump, resulting in achieving a reduction in occurrence of cavitation in the pump.

In the aircraft according to a second feature, in the first feature, the controller is configured to: increase a pressure in the first tank in advance to switch the second tank from the temperature restoring phase to the fuel supply phase before the switching to the fuel supply phase; and increase a pressure in the second tank in advance to switch the second tank from the temperature restoring phase to the fuel supply phase before the switching to the fuel supply phase. The second feature enables cooling of the liquefied hydrogen by increasing the pressure in the relevant tank in advance before proceeding to the fuel supply phase and reducing the pressure in the tank in the temperature restoring phase.

In the aircraft according to a third feature, in the first or second feature, each of the first tank and the second tank includes: a return line that returns the low-temperature liquid fuel sent out of the first tank or the second tank to the first tank or the second tank; and a pressure-increase vaporizer that heats and vaporizes the low-temperature liquid fuel in the return line. A pressure in each of the first tank and the second tank is increased by returning vaporized fuel resulting from the vaporization to each of the first tank and the second tank via the return line. The third feature achieves an increase in the pressure in each tank without using a compressor by making the vaporizer vaporize the low-temperature liquid fuel sent out of the first tank or the second tank, and thereafter returning resultant vaporized gas to the first tank or the second tank.

The aircraft according to a fourth feature, in any one of the first to third features, further includes a temperature sensor that measures a temperature in the first tank and a temperature sensor that measures a temperature in the second tank. The controller switches between the first mode and the second mode on the basis of the temperature of the low-temperature liquid fuel in the first tank and the temperature of the low-temperature liquid fuel in the second tank, the temperatures being measured respectively by the temperature sensors. The fourth feature enables appropriate switching between the first mode and the second mode on the basis of the temperature of the low-temperature liquid fuel in the first tank and the temperature of the low-temperature liquid fuel in the second tank.

In the aircraft according to a fifth feature, in the fourth feature, the controller switches to the second mode when the temperature of the low-temperature liquid fuel in the first tank is a predetermined first threshold or higher, and switches to the first mode when the temperature of the low-temperature liquid fuel in the second tank is the first threshold or higher. The fifth feature provides appropriate switching to the first mode or the second mode when the temperature of the low-temperature liquid fuel in the associated tank in the fuel supply phase reaches the first threshold or higher. This configuration enables constant supply of the cooled low-temperature liquid fuel to the pump.

In the aircraft according to a sixth feature, in any one of the first to fifth features, the cooling in the first tank is executed by reducing a pressure in the first tank and the cooling in the second tank is executed by reducing a pressure in the second tank. The sixth feature enables cooling of the low-temperature liquid fuel in each tank without using a freezer or a heat exchanger.

The aircraft according to a seventh feature, in the sixth feature, further includes: a vent line connected to the first tank and a vent line connected to the second tank; and a pressure regulating valve located on the vent line for the first tank and a pressure regulating valve located on the vent line for the second tank. The controller is configured to open the pressure regulating valve for the first tank to reduce the pressure in the first tank, and is configured to open the pressure regulating valve for the second tank to reduce the pressure in the second tank. The seventh feature enables cooling of the low-temperature liquid fuel in the associated tank by opening the associated pressure regulating valve to reduce the internal pressure in the tank.

The aircraft according to an eighth feature, in any one of the first to fifth features, further includes: vent lines connected to the first tank and vent lines connected to the second tank; pressure regulating valves located respectively on the vent lines; and one or more switch valves located between the first and second tanks and the pump. The cooling in the first tank is executed by opening the pressure regulating valves connected to the first tank and the cooling in the second tank is executed by opening the pressure regulating valves connected to the second tank. The controller switches between the first mode and the second mode by controlling the pressure regulating valves and the one or more switch valves. The eighth feature enables switching between the first mode and the second mode by controlling the one or more switch valves, and lowering of the temperature of the low-temperature liquid fuel in each tank in the temperature restoring phase by opening the associated pressure regulating valves in the temperature restoring phase.

The aircraft according to a ninth feature, in any one of the first to eighth features, further includes: an ejector that communicates with an outlet of the pump via a pipe; a vaporizer that vaporizes the low-temperature liquid fuel flowing in the pipe; and a vent line that connects the first tank and the ejector to each other and a vent line that connects the second tank and the ejector to each other. Vaporized gas of the low-temperature liquid fuel generated in each of the first tank and the second tank is supplied to the ejector via each of the vent lines. The ninth feature enables supply of the vaporized gas of the low-temperature liquid fuel discharged from each of the first tank and the second tank to the ejector via the associated vent line. This configuration achieves effective utilization of the vaporized gas of the low-temperature liquid fuel in surplus, i.e., the boil-off gas, generated in each of the first tank and the second tank.

The aircraft according to a tenth feature, in the ninth feature, further includes: a sub-buffer tank located on each of the vent lines to store the vaporized gas of the low-temperature liquid fuel; and an on-off valve located between the sub-buffer tank and the ejector on each of the vent lines. According to the tenth feature, the sub-buffer tank located on the associated vent line achieves reliable keeping of vaporized gas flowing in the vent line. Moreover, this configuration enables easy switching between supply of the vaporized gas flowing in the vent line to the ejector and suspension of the supply by switching the on-off valve located on the vent line, the vent line connecting the sub-buffer tank and the ejector to each other.

The aircraft according to an eleventh feature, in the tenth feature, further includes at least one of an accumulator connected to the pipe connecting the pump and the vaporizer to each other, or a buffer tank located on the pipe connecting the vaporizer and the ejector to each other. The eleventh feature with the at least one of the accumulator or the buffer tank enables stable supply of the vaporized gas of the low-temperature liquid fuel to the ejector even in switching transition between the first mode and the second mode.

A fuel supply method according to a twelfth feature is a method of supplying low-temperature liquid fuel stored in a first tank and a second tank to a pump connected to the first tank and the second tank. The fuel supply method includes: allowing each of the first tank and the second tank to be switched between a fuel supply phase of supplying the low-temperature liquid fuel to the pump, and a temperature restoring phase of cooling the low-temperature liquid fuel in each of the first tank and the second tank; and supplying the low-temperature liquid fuel to the pump by alternately switching between a first mode where the first tank is in the fuel supply phase and the second tank is in the temperature restoring phase, and a second mode where the first tank is in the temperature restoring phase and the second tank is in the fuel supply phase. The twelfth feature enables constant supply of the low-temperature liquid fuel having been sufficiently cooled to the pump by alternately switching between the first mode and the second mode.

An aircraft according to a thirteenth feature that adopts low-temperature liquid fuel as an energy source includes: a tank storing low-temperature liquid fuel; a pump that communicates with the tank via a pipe; and a fuel cooler that cools the low-temperature liquid fuel flowing in the pipe. According to the thirteenth feature, the fuel cooler cools the low-temperature liquid fuel flowing in the pipe. Thus, the pump receives supply of the low-temperature liquid fuel having been sufficiently cooled. This results in a reduction in occurrence of cavitation in the pump.

In the aircraft according to a fourteenth feature, in the thirteenth feature, the fuel cooler includes one of a cooling tank, a freezer, a turbine, and a heat exchanger. The fourteenth feature enables appropriate cooling of the low-temperature liquid fuel by any one of the cooling tank, the freezer, and the turbine.

The aircraft according to a fifteenth feature, in the thirteenth or fourteenth feature, further includes a controller. The controller is configured to cool the low-temperature liquid fuel so that a temperature of the low-temperature liquid fuel flowing in the fuel cooler is lower than a temperature of the low-temperature liquid fuel stored in the tank. The fifteenth feature enables the controller to control the low-temperature liquid fuel to have an appropriate temperature.

In the aircraft according to a sixteenth feature, in the fifteenth feature, the fuel cooler includes a cooling tank, and the cooling tank is filled with the low-temperature liquid fuel. The controller controls a pressure in the cooling tank so that the pressure in the cooling tank is lower than a pressure in the tank. The sixteenth feature allows a temperature of the low-temperature liquid fuel in the cooling tank to be controlled to be lower than the temperature of the low-temperature liquid fuel in the tank by controlling the pressure in the cooling tank to be lower than the pressure in the tank.

The aircraft according to a seventeenth feature, in the sixteenth feature, further includes: a vent line connected to the cooling tank; a pressure regulating valve located on the vent line; and a pressure sensor that measures the pressure in the cooling tank. The controller is configured to open the pressure regulating valve to reduce the pressure in the cooling tank when a measurement value of the pressure sensor is a predetermined fourth threshold or higher, and close the pressure regulating valve to increase the pressure in the cooling tank when the measurement value is a predetermined fifth threshold or lower. The seventeenth feature enables control of the temperature of the low-temperature liquid fuel in the cooling tank to an appropriate temperature by controlling the pressure in the cooling tank to fall within an appropriate range.

The aircraft according to an eighteenth feature, in the sixteenth feature, further includes: a vent line connected to the cooling tank; a pressure regulating valve located on the vent line; and a pressure sensor that measures the pressure in the cooling tank. The controller is configured to open the pressure regulating valve to reduce the pressure in the cooling tank when the pressure in the cooling tank is a predetermined sixth threshold or higher. The eighteenth feature enables control of the temperature of the low-temperature liquid fuel in the cooling tank to an appropriate temperature by controlling the pressure in the cooling tank to avoid reaching the sixth threshold or higher.

The aircraft according to a nineteenth feature, in any one of the thirteenth to eighteenth features, further includes: an ejector that communicates with an outlet of the pump via the pipe; a vaporizer that vaporizes the low-temperature liquid fuel flowing in the pipe; and a vent line that connects the tank and the ejector to each other. Vaporized gas of the low-temperature liquid fuel generated in the tank is supplied to the ejector via the vent line. The nineteenth feature achieves effective utilization of the vaporized gas of the low-temperature liquid fuel generated in the tank by supplying the vaporized gas generated in the tank to the ejector via the vent line.

In the aircraft according to a twentieth feature, in any one of the thirteenth to nineteenth features, the fuel cooler includes a cooling tank, and the cooling tank is filled with the low-temperature liquid fuel. The aircraft further includes: an ejector that communicates with an outlet of the pump via the pipe; a vaporizer that vaporizes the low-temperature liquid fuel flowing in the pipe; and a cooling vent line that connects the ejector and the cooling tank to each other. Vaporized gas of the low-temperature liquid fuel generated in the cooling tank is supplied to the ejector via the cooling vent line. The twentieth feature enables supply of the vaporized gas generated in the cooling tank to the ejector via the cooling vent line. This configuration achieves effective utilization of the low-temperature liquid fuel.

The aircraft according to a twenty first feature, in the nineteenth or twentieth feature, further includes: a buffer tank that stores vaporized gas of the low-temperature liquid fuel flowing in the vent line and the cooling vent line; and an on-on-off valve located between the buffer tank and the ejector. According to the twenty first feature, the buffer tank stores the vaporized gas of the low-temperature liquid fuel flowing in the vent line and the cooling vent line. This configuration enables stable supply of the vaporized gas stored in the buffer tank to the ejector. This configuration further enables supply of the vaporized gas in an appropriate amount to the ejector by switching a communication state between the buffer tank and the ejector by the on-off valve.

The aircraft according to a twenty second feature, in the twenty first feature, further includes: a flow rate sensor that measures a flow rate of the low-temperature liquid fuel supplied to an inlet of the vaporizer or a flow rate of the low-temperature liquid fuel sent out of an outlet of the vaporizer; and a controller. The controller controls the on-off valve to open or close on the basis of the flow rate of the low-temperature liquid fuel measured by the flow rate sensor. The twenty second feature enables supply of the vaporized gas in the appropriate amount from the buffer tank to the ejector by appropriately controlling the on-off valve to open or close on the basis of the flow rate of the low-temperature liquid fuel measured by the flow rate sensor.

An aircraft according to a twenty third feature that adopts low-temperature liquid fuel as an energy source includes: a fuel tank storing low-temperature liquid fuel; a pump that communicates with the tank via a pipe; an ejector that communicates with an outlet of the pump via the pipe; a vaporizer that vaporizes the low-temperature liquid fuel flowing in the pipe; and a vent line that connects the tank and the ejector to each other. Vaporized gas of the low-temperature liquid fuel generated in the tank is supplied to the ejector via the vent line. According to the twenty third feature, the low-temperature liquid fuel having flowed out of the outlet of the pump and flowing in the pipe is vaporized by the vaporizer, and thereafter is supplied to the ejector. Vaporized gas of the low-temperature liquid fuel resulting from vaporization in the tank is supplied to the ejector via the vent line. This configuration achieves effective utilization of the low-temperature liquid fuel.

The invention claimed is:

1. An aircraft that adopts low-temperature liquid fuel as an energy source, the aircraft comprising:

a first tank and a second tank, each of which stores the low-temperature liquid fuel;

a pump that receives supply of the low-temperature liquid fuel from the first tank and the second tank; and a controller, wherein the low-temperature liquid fuel is one of liquified hydrogen, liquified petroleum gas, liquified natural gas or ammonia, each of the first tank and the second tank is switched between a fuel supply phase of supplying the low-temperature liquid fuel to the pump and a temperature restoring phase of cooling the low-temperature liquid fuel in each of the first tank and the second tank, and the controller switches between a first mode where the first tank is in the fuel supply phase and the second tank is in the temperature restoring phase, and a second mode where the first tank is in the temperature restoring phase and the second tank is in the fuel supply phase.

2. The aircraft according to claim 1, further comprising:

vent lines connected to the first tank and vent lines connected to the second tank;

pressure regulating valves located respectively on the vent lines; and one or more switch valves located between the first and second tanks and the pump, wherein the cooling in the first tank is executed by opening the pressure regulating valves connected to the first tank and the cooling in the second tank is executed by opening the pressure regulating valves connected to the second tank, and the controller switches between the first mode and the second mode by controlling the pressure regulating valves and the one or more switch valves.

3. The aircraft according to claim 1, further comprising a temperature sensor that measures a temperature of the low-temperature liquid fuel in the first tank and a temperature sensor that measures a temperature of the low-temperature liquid fuel in the second tank, wherein the controller switches between the first mode and the second mode on the basis of the temperature of the low-temperature liquid fuel in the first tank and the temperature of the low-temperature liquid fuel in the second tank, the temperatures being measured respectively by the temperature sensors.

4. The aircraft according to claim 3, wherein the controller switches to the second mode when the temperature of the low-temperature liquid fuel in the first tank is a predetermined first threshold or higher, and switches to the first mode when the temperature of the low-temperature liquid fuel in the second tank is the first threshold or higher.

5. The aircraft according to claim 1, wherein the cooling in the first tank is executed by reducing a pressure in the first tank and the cooling in the second tank is executed by reducing a pressure in the second tank.

6. The aircraft according to claim 5, further comprising:

a vent line connected to the first tank and a vent line connected to the second tank; and a pressure regulating valve located on the vent line for the first tank and a pressure regulating valve located on the vent line for the second tank, wherein the controller is configured to open the pressure regulating valve for the first tank to reduce the pressure in the first tank, and is configured to open the pressure regulating valve for the second tank to reduce the pressure in the second tank.

7. The aircraft according to claim 1, wherein the controller is configured to:

increase a pressure in the first tank in advance to switch the first tank from the temperature restoring phase to the fuel supply phase before the switching to the fuel supply phase; and increase a pressure in the second tank in advance to switch the second tank from the temperature restoring phase to the fuel supply phase before the switching to the fuel supply phase.

8. The aircraft according to claim 7, wherein each of the first tank and the second tank includes:

a return line that returns the low-temperature liquid fuel sent out of the first tank or the second tank to the first tank or the second tank; and a pressure-increase vaporizer that heats and vaporizes the low-temperature liquid fuel in the return line, wherein a pressure in each of the first tank and the second tank is increased by returning vaporized fuel resulting from the vaporization to each of the first tank and the second tank via the return line.

9. The aircraft according to claim 7, further comprising a temperature sensor that measures a temperature of the low-temperature liquid fuel in the first tank and a temperature sensor that measures a temperature of the low-temperature liquid fuel in the second tank, wherein the controller switches between the first mode and the second mode on the basis of the temperature of the low-temperature liquid fuel in the first tank and the temperature of the low-temperature liquid fuel in the second tank, the temperatures being measured respectively by the temperature sensors.

10. The aircraft according to claim 1, further comprising:

an ejector that communicates with an outlet of the pump via a pipe;

a vaporizer that vaporizes the low-temperature liquid fuel flowing in the pipe; and a vent line that connects the first tank and the ejector to each other and a vent line that connects the second tank and the ejector to each other, wherein vaporized gas of the low-temperature liquid fuel generated in each of the first tank and the second tank is supplied to the ejector via each of the vent lines.

11. The aircraft according to claim 10, further comprising:

a sub-buffer tank located on each of the vent lines to store the vaporized gas of the low-temperature liquid fuel; and an on-off valve located between the sub-buffer tank and the ejector on each of the vent lines.

12. The aircraft according to claim 11, further comprising at least one of an accumulator connected to the pipe connecting the pump and the vaporizer to each other, or a buffer tank located on the pipe connecting the vaporizer and the ejector to each other.

13. The aircraft according to claim 1, wherein each of the first tank and the second tank includes:

a return line that returns the low-temperature liquid fuel sent out of the first tank or the second tank to the first tank or the second tank; and a pressure-increase vaporizer that heats and vaporizes the low-temperature liquid fuel in the return line, wherein a pressure in each of the first tank and the second tank is increased by returning vaporized fuel resulting from the vaporization to each of the first tank and the second tank via the return line.

14. The aircraft according to claim 13, further comprising a temperature sensor that measures a temperature of the low-temperature liquid fuel in the first tank and a temperature sensor that measures a temperature of the low-temperature liquid fuel in the second tank, wherein the controller switches between the first mode and the second mode on the basis of the temperature of the low-temperature liquid fuel in the first tank and the temperature of the low-temperature liquid fuel in the second tank, the temperatures being measured respectively by the temperature sensors.

15. The aircraft according to claim 9, wherein the controller switches to the second mode when the temperature of the low-temperature liquid fuel in the first tank is a predetermined first threshold or higher, and switches to the first mode when the temperature of the low-temperature liquid fuel in the second tank is the first threshold or higher.

16. The aircraft according to claim 14, wherein the controller switches to the second mode when the temperature of the low-temperature liquid fuel in the first tank is a predetermined first threshold or higher, and switches to the first mode when the temperature of the low-temperature liquid fuel in the second tank is the first threshold or higher.

17. A fuel supply method of supplying low-temperature liquid fuel stored in a first tank and a second tank to a pump connected to the first tank and the second tank, the fuel supply method comprising:

allowing each of the first tank and the second tank to be switched between a fuel supply phase of supplying the low-temperature liquid fuel to the pump, and a temperature restoring phase of cooling the low-temperature liquid fuel in each of the first tank and the second tank; and supplying the low-temperature liquid fuel to the pump by switching between a first mode where the first tank is in the fuel supply phase and the second tank is in the temperature restoring phase, and a second mode where the first tank is in the temperature restoring phase and the second tank is in the fuel supply phase, wherein the low-temperature liquid fuel is one of liquified hydrogen, liquified petroleum gas, liquified natural gas or ammonia.

* * * * *